US010042332B2

(12) United States Patent
Saito et al.

(10) Patent No.: US 10,042,332 B2
(45) Date of Patent: Aug. 7, 2018

(54) ELECTRIC/THERMAL ENERGY STORAGE SCHEDULE OPTIMIZING DEVICE, OPTIMIZING METHOD AND OPTIMIZING PROGRAM

(71) Applicant: Kabushiki Kaisha Toshiba, Tokyo (JP)

(72) Inventors: Masaaki Saito, Itabashi-ku (JP); Dai Murayama, Musashino (JP); Kenji Mitsumoto, Miyamae-ku (JP); Yasuo Takagi, Chigasaki (JP); Yutaka Iino, Tama-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 13/822,783

(22) PCT Filed: Jan. 10, 2013

(86) PCT No.: PCT/JP2013/050264
§ 371 (c)(1),
(2) Date: Jul. 1, 2013

(87) PCT Pub. No.: WO2013/128953
PCT Pub. Date: Jun. 9, 2013

(65) Prior Publication Data
US 2014/0094980 A1    Apr. 3, 2014

(30) Foreign Application Priority Data

Feb. 27, 2012  (JP) .................................. 2012-040650

(51) Int. Cl.
*G05D 3/12*    (2006.01)
*G05D 5/00*    (2006.01)
(Continued)

(52) U.S. Cl.
CPC ....... *G05B 13/026* (2013.01); *G05D 23/1923* (2013.01); *H02J 3/14* (2013.01);
(Continued)

(58) Field of Classification Search
CPC ..... G05B 13/026; G05D 23/1923; H02J 3/28; H02J 3/14; H02J 3/32; H02J 3/00;
(Continued)

(56) References Cited

U.S. PATENT DOCUMENTS 3,932,735 A * 1/1976 Giras ........................... 700/287
5,274,571 A  12/1993 Hesse et al.
(Continued)

FOREIGN PATENT DOCUMENTS

JP    9-189442 A    7/1997
JP    11-248224 A   9/1999
(Continued)

OTHER PUBLICATIONS

Iino et al., Hybrid Modeling with Physical and JIT Model for Building Thermal Load Prediction and Optimal Energy Saving Control, 2009, IEEE, pp. 2008-2011.*
(Continued)

*Primary Examiner* — Thomas Lee
*Assistant Examiner* — Zhipeng Wang
(74) *Attorney, Agent, or Firm* — Oblon, McClelland, Maier & Neustadt, L.L.P.

(57) ABSTRACT

An electric/thermal energy storage schedule optimizing device is provided. The electric/thermal energy storage schedule optimizing device includes a predicting unit setting predicted values of a consumed energy or a supplying energy of a plurality of control-target devices. The electric/thermal energy storage schedule optimizing device also includes a start-stop optimizing unit creating start-stop schedules of the plurality of control-target devices based on the predicted values set by the predicting unit.

10 Claims, 20 Drawing Sheets

(51) Int. Cl.

| | | |
|---|---|---|
| *G05D 9/00* | (2006.01) | |
| *G05D 11/00* | (2006.01) | |
| *G05D 17/00* | (2006.01) | |
| *G05B 13/02* | (2006.01) | |
| *H02J 3/14* | (2006.01) | |
| *H02J 3/28* | (2006.01) | |
| *G05D 23/19* | (2006.01) | |
| *F24F 5/00* | (2006.01) | |
| *F24F 11/46* | (2018.01) | |

(52) U.S. Cl.
CPC ............... *H02J 3/28* (2013.01); *F24F 11/46* (2018.01); *F24F 2005/0067* (2013.01); *H02J 2003/143* (2013.01); *Y02B 70/3225* (2013.01); *Y02B 70/3275* (2013.01); *Y02E 10/566* (2013.01); *Y02E 20/14* (2013.01); *Y02E 70/30* (2013.01); *Y04S 20/222* (2013.01); *Y04S 20/244* (2013.01)

(58) Field of Classification Search
CPC .......... H02J 7/35; H02J 3/46; H02J 2003/143; F02G 5/04; F24F 11/02; F24F 2005/0067; F24F 2011/0075; Y04S 20/222; Y04S 20/244; Y02E 10/566; Y02E 70/30; Y02E 20/14; Y02B 70/3275; Y02B 70/3225
USPC ........................................................ 700/291
See application file for complete search history.

(56) References Cited

U.S. PATENT DOCUMENTS

| | | | |
|---|---|---|---|
| 5,479,358 A * | 12/1995 | Shimoda et al. | 700/291 |
| 5,502,339 A * | 3/1996 | Hartig | 307/31 |
| 5,566,084 A * | 10/1996 | Cmar | 700/276 |
| 6,061,609 A * | 5/2000 | Kanoi et al. | 700/291 |
| 6,591,901 B2 * | 7/2003 | Bujak, Jr. | F24F 3/06 165/208 |
| 6,860,431 B2 | 3/2005 | Jayadev | |
| 8,082,068 B2 * | 12/2011 | Rodgers | G01D 4/004 700/291 |
| 8,532,835 B2 * | 9/2013 | McLean | 700/291 |
| 8,543,248 B2 | 9/2013 | Iino et al. | |
| 8,886,361 B1 * | 11/2014 | Harmon | G06Q 10/04 700/291 |
| 9,106,100 B2 * | 8/2015 | MacLellan et al. | |
| 9,335,748 B2 * | 5/2016 | Francino | G05B 15/02 |
| 2004/0230344 A1 * | 11/2004 | Gallupe et al. | 700/300 |
| 2004/0239494 A1 * | 12/2004 | Kennedy et al. | 340/500 |
| 2005/0102068 A1 * | 5/2005 | Pimputkar et al. | 700/291 |
| 2005/0192915 A1 * | 9/2005 | Ahmed et al. | 706/21 |
| 2006/0260311 A1 * | 11/2006 | Ingersoll | 60/641.1 |
| 2007/0220907 A1 * | 9/2007 | Ehlers | 62/126 |
| 2007/0239317 A1 * | 10/2007 | Bogolea et al. | 700/276 |
| 2007/0244602 A1 * | 10/2007 | Kanai et al. | 700/276 |
| 2009/0125149 A1 | 5/2009 | Miwa | |
| 2009/0171512 A1 * | 7/2009 | Duncan | F24F 5/0035 700/300 |
| 2009/0234511 A1 * | 9/2009 | Ouchi et al. | 700/291 |
| 2010/0004791 A1 * | 1/2010 | West et al. | 700/291 |
| 2010/0060079 A1 | 3/2010 | MacLellan et al. | |
| 2010/0088261 A1 * | 4/2010 | Montalvo | 706/15 |
| 2010/0106674 A1 | 4/2010 | McLean et al. | |
| 2010/0108811 A1 * | 5/2010 | Gupta | B64D 37/32 244/129.2 |
| 2010/0179704 A1 * | 7/2010 | Ozog | 700/291 |
| 2010/0222934 A1 | 9/2010 | Iino et al. | |
| 2010/0259931 A1 * | 10/2010 | Chemel et al. | 362/249.02 |
| 2010/0332044 A1 * | 12/2010 | McLean | G06Q 10/06 700/291 |
| 2011/0047052 A1 * | 2/2011 | Cornish | 705/30 |
| 2011/0106321 A1 * | 5/2011 | Cherian et al. | 700/286 |
| 2011/0106328 A1 * | 5/2011 | Zhou et al. | 700/291 |
| 2011/0125337 A1 * | 5/2011 | Zavadsky et al. | 700/291 |
| 2011/0184587 A1 * | 7/2011 | Vamos et al. | 700/297 |
| 2011/0204720 A1 * | 8/2011 | Ruiz | B60L 11/1816 307/66 |
| 2011/0231028 A1 | 9/2011 | Ozog | |
| 2011/0254697 A1 * | 10/2011 | Casey et al. | 340/870.02 |
| 2012/0004783 A1 * | 1/2012 | Lo et al. | 700/291 |
| 2012/0010758 A1 * | 1/2012 | Francino et al. | 700/291 |
| 2012/0016638 A1 | 1/2012 | McLean et al. | |
| 2012/0065805 A1 * | 3/2012 | Montalvo | 700/297 |
| 2012/0153725 A1 * | 6/2012 | Grohman | 307/39 |
| 2012/0173029 A1 * | 7/2012 | MacLellan et al. | 700/291 |
| 2012/0271784 A1 | 10/2012 | McLean et al. | |
| 2012/0296482 A1 * | 11/2012 | Steven | G06Q 50/06 700/291 |
| 2013/0144451 A1 * | 6/2013 | Kumar et al. | 700/291 |
| 2014/0039709 A1 * | 2/2014 | Steven et al. | 700/291 |
| 2014/0039832 A1 | 2/2014 | McLean | |
| 2014/0148963 A1 | 5/2014 | Ozog | |
| 2014/0163753 A1 * | 6/2014 | Brady | G06Q 50/06 700/286 |
| 2014/0332195 A1 * | 11/2014 | Liberman | G05D 23/1917 165/267 |

FOREIGN PATENT DOCUMENTS

| | | |
|---|---|---|
| JP | 3519321 | 4/2004 |
| JP | 2004-317049 A | 11/2004 |
| JP | 3669755 | 7/2005 |
| JP | 3763767 | 4/2006 |
| JP | 2006-266520 A | 10/2006 |
| JP | 2006-350920 A | 12/2006 |
| JP | 2010-204833 A | 9/2010 |
| JP | 2011-106779 A | 6/2011 |
| JP | 2011-234570 A | 11/2011 |
| JP | 2012-147546 A | 8/2012 |
| WO | WO 2011/086886 A1 | 7/2011 |

OTHER PUBLICATIONS

Li et al., "Predicting Hourly Cooling Load in the Building: A Comparison of Support Vector Machine and Different Artificial Neural Networks", 2008, Elsevier, pp. 90-96.*
International Search Report and Written Opinion dated Apr. 16, 2013, in PCT/JP2013/050264 with English translation of category of cited documents, 10 pages.
Extended European Search Report dated Nov. 5, 2015 in Patent Application No. 13729581.2, 8 pages.
Combined Search Report and Written Opinion dated Dec. 17, 2015 in Singaporean Patent Application No. 2013050018, 10 pages.

* cited by examiner

FIG. 6

| DAY NUMBER | DAY OF WEEK | WEATHER | MAXIMUM TEMPERATURE [°C] $TM_i$ | LOWEST TEMPERATURE [°C] $TL_i$ | RELATIVE HUMIDITY[%RH] $RH_i$ | PMV SETTING VALUE (OR MEASURED VALUE) $PMV_i$ | ILLUMINATION SETTING VALUE (OR MEASURED VALUE) $L_i$ |
|---|---|---|---|---|---|---|---|
| 1 | MONDAY | SUNNY | 33.0 | 24.0 | 56 | 0.2 | 500 |
| 2 | TUESDAY | SUNNY | 33.0 | 23.0 | 56 | 0.2 | 500 |
| 3 | WEDNESDAY | CLOUDY | 29.0 | 20.0 | 50 | 0.3 | 500 |
| 4 | THURSDAY | SUNNY | 33.0 | 25.6 | 55 | 0.1 | 550 |
| 5 | FRIDAY | CLOUDY | 26.0 | 22.0 | 59 | 0.4 | 550 |
| 6 | SATURDAY | SUNNY | 30.0 | 24.0 | 59 | 0.5 | 600 |
| 7 | SUNDAY | CLOUDY | 30.0 | 25.0 | 72 | 0.5 | 600 |
| 8 | MONDAY | SUNNY | 27.5 | 23.0 | 56 | 0.5 | 550 |
| 9 | TUESDAY | RAINY | 27.0 | 22.8 | 98 | 0.2 | 500 |
| 10 | WEDNESDAY | SUNNY | 26.5 | 20.7 | 55 | 0.3 | 550 |
| 11 | THURSDAY | CLOUDY | 26.0 | 28.6 | 71 | 0.0 | 600 |
| 12 | FRIDAY | SUNNY | 31.0 | 26.0 | 56 | 0.0 | 600 |
| 13 | SATURDAY | RAINY | 28.0 | 20.0 | 95 | 0.1 | 650 |
| ⋮ | ⋮ | | | | | | |
| n−1 | THURSDAY | SUNNY | 27.5 | 18.8 | 47 | 0.2 | 650 |
| n | FRIDAY | RAINY | 27.0 | 17.7 | 87 | 0.2 | 700 |

FIG. 8

COLD WATER PRODUCTION UNIT PRICE TABLE

| | | FIRST CASE | SECOND CASE | THIRD CASE | FOURTH CASE | FIFTH CASE | SIXTH CASE |
|---|---|---|---|---|---|---|---|
| CONTROL-TARGET DEVICE | CGS | × | × | ○ POWER GENERATION VARIABLE | ○ POWER GENERATION INVARIABLE | × | × |
| | WATER-COOLED REFRIGERATOR | ○ | × | × | × | × | × |
| | HEAT PUMP CHILLER | × | ○ | × | × | × | × |
| | SOLAR-POWERED WATER HEATER | × | × | × | × | ○ | × |
| | ABSORPTION WATER COOLER/HEATER (USE GAS) | × | × | × | × | × | ○ |
| | ABSORPTION WATER COOLER/HEATER (LOADED WITH EXHAUSTED HEAT) | × | × | ○ | ○ | ○ | × |
| COLD HEAT PRODUCTION UNIT PRICE [YEN/kWh] | | 2.27 | 4.44 | 14.44 | 2.89 | 0.00 | 8.00 |

FIG. 9

HOT HEAT PRODUCTION UNIT PRICE

| | | FIRST CASE | SECOND CASE | THIRD CASE | FOURTH CASE | FIFTH CASE |
|---|---|---|---|---|---|---|
| CONTROL-TARGET DEVICE | CGS | × | ○ POWER GENERATION VARIABLE | ○ POWER GENERATION INVARIABLE | × | × |
| | HEAT PUMP CHILLER | ○ | × | × | × | × |
| | SOLAR-POWERED WATER HEATER | × | × | × | ○ | × |
| | ABSORPTION WATER COOLER/HEATER (USE GAS) | × | × | × | × | ○ |
| HOT HEAT PRODUCTION UNIT PRICE [YEN/kWh] | | 3.93 | 11.18 | 2.24 | 0 | 9.00 |

FIG. 15

OPTIMIZED VARIABLE LIST

| VARIABLE NAME | PHYSICAL QUANTITY | UPPER AND LOWER LIMIT | UNIT |
|---|---|---|---|
| X1 | PURCHASED POWER LEVEL | $0 \leq X1 \leq$ CONTRACTED POWER | [kWh] |
| X2 | HEAT PUMP LOADING FACTOR (COLD WATER PRODUCTION) | LOWER LIMIT $\leq X2 \leq 1$ | - |
| X3 | HEAT PUMP LOADING FACTOR (HOT WATER PRODUCTION) | LOWER LIMIT $\leq X3 \leq 1$ | - |
| X4 | ABSORPTION WATER COOLER/HEATER LOADING FACTOR (EXHAUSTED HEAT LOADING MODE) | LOWER LIMIT $\leq X4 \leq 1$ | - |
| X5 | ABSORPTION WATER COOLER/HEATER LOADING FACTOR (COLD WATER PRODUCTION, USING GAS) | LOWER LIMIT $\leq X5 \leq 1$ | - |
| X6 | ABSORPTION WATER COOLER/HEATER LOADING FACTOR (HOT WATER PRODUCTION, USING GAS) | LOWER LIMIT $\leq X6 \leq 1$ | - |
| X7 | WATER-COOLED REFRIGERATOR LOADING FACTOR | LOWER LIMIT $\leq X7 \leq 1$ | - |
| X8 | CGS LOADING FACTOR | LOWER LIMIT $\leq X8 \leq 1$ | - |
| X9 | REMAINING HEAT STORAGE LEVEL | $0 \leq X9 \leq$ HEAT STORAGE CAPACITY | [kWh] |
| X10 | REMAINING ELECTRIC STORAGE LEVEL | $0 \leq X10 \leq$ BATTERY CAPACITY | [kWh] |
| X11 | CGS ON / OFF | 1 / 0 | - |
| X12 | HEAT PUMP ON/OFF (COLD WATER PRODUCTION) | 1 / 0 | - |
| X13 | HEAT PUMP ON/OFF (HOT WATER PRODUCTION) | 1 / 0 | - |
| X14 | ABSORPTION WATER COOLER/HEATER ON/OFF (EXHAUSTED GAS LOADING MODE) | 1 / 0 | - |
| X15 | ABSORPTION WATER COOLER/HEATER ON/OFF (COLD WATER PRODUCTION, USING GAS) | 1 / 0 | - |
| X16 | ABSORPTION WATER COOLER/HEATER ON/OFF (HOT WATER PRODUCTION, USING GAS) | 1 / 0 | - |
| X17 | WATER-COOLED REFRIGERATOR ON/OFF | 1 / 0 | - |

ELECTRIC/THERMAL ENERGY STORAGE SCHEDULE OPTIMIZING DEVICE, OPTIMIZING METHOD AND OPTIMIZING PROGRAM

FIELD

Embodiments described herein relate to a technology of optimizing the operation schedule of a control-target device in a construct, such as an energy supplying device, an energy consuming device, or an energy storage device.

BACKGROUND

The energy consumption by commercial work-related sectors in constructs like buildings in Japan occupies substantially 20% of the final whole energy consumption. Hence, when a manager of a building, a user thereof continuously saves energy, the final energy consumption can be suppressed.

Moreover, the needs for a so-called peak-cut that decreases the energy consumption in a peak time slot increase in accordance with recent shortfall of electric power supply. For example, the upper limit of the power consumption is set for commercial-scale utility customers like buildings. Moreover, the needs for a peak shift having the peak of an energy consumption shifted in time using a thermal energy storage device increase.

Under such a background circumstance, it is expected that the installation of energy supplying devices utilizing regenerative energy, such as solar power and solar heat, is further accelerated in future. However, the output by energy supplying devices utilizing regenerative energy largely varies depending on a climate condition like weather. Hence, it is also expected that the installation of energy storage devices like a battery and a thermal energy storage device, that can compensate such variability is accelerated from now on.

As explained above, it is expected that energy supplying devices and energy storage devices installed in facilities like buildings become diversified from now on. Moreover, a planning scheme of an operation plan for efficiently operating those devices well linked with existing devices in the whole construct becomes necessary.

For example, there is a scheme of minimizing the energy consumption, the costs, and the $CO_2$ producing level during a predetermined time period for an energy supplying facility with a thermal energy storage tank. There are also a scheme of performing peak-cut based on an air-conditioner load prediction, and a scheme of utilizing an ice thermal storage air-conditioner for a peak-cut. (Japan Patent No. 3763767, 3519321, and 3669755)

SUMMARY

Conventional planning schemes of an operation plan in a building are all schemes focusing on only the thermal energy storage. Solar power generation device and a battery thereof, a solar-powered water heater are out of consideration which have the energy level to be supplied varying depending on a weather.

Moreover, according to the conventional schemes, an energy consumption level is predicted in advance, and the operation plans of an energy consuming device and an energy storage device are designed based on the predicted value. In general, however, the energy consumption level is predicted based on past data on weather and a power demand, etc. Accordingly, the characteristics depending on the operation status of multiple devices of different kinds are out of consideration at the time of prediction, and the highly precise prediction cannot be always obtained.

Embodiments described herein have been made in order to address the above-explained technical disadvantages, and it is an object of the present invention to provide an electric/thermal energy storage optimizing technology of performing prediction and setting of an electric/thermal energy storing schedule in consideration of respective control set values of control-target devices, thereby enhancing a prediction precision, and enabling an efficient operation.

In order to accomplish the above object, an embodiment of the present invention employs the following technical features:

(1) a setting unit that sets a control setting value for setting an activation, an operation, and a deactivation during a future predetermined time period for at least one of control-target devices that are an energy supplying device including a device which changes an energy supply level depending on a weather condition, an energy consuming device which consumes energy, and an energy storage device which stores energy;

(2) a predicting unit that sets a predicted value of consumed energy of the energy consuming device or supplying energy of the energy supplying device during the future predetermined time period based on a comparison between the control setting value set by the setting unit and a past control setting value;

(3) a start-stop optimizing unit that creates a start-stop schedule obtained by optimizing a start-stop schedule of the control-target device during the predetermined time period based on the predicted value and a characteristic of the control-target device in view of a predetermined evaluation index; and (4) a status-quantity optimizing unit that creates an electric/thermal energy storing schedule obtained by optimizing a status quantity of the control-target device to be activated based on the start-stop schedule and the characteristic of the control-target device in view of the predetermined evaluation index.

Other aspects of the embodiment are a method for realizing the functions of the above-explained respective units by a computer or electronic circuits, and a program for causing the computer to realize the above-explained functions.

BRIEF DESCRIPTION OF DRAWINGS

FIG. 6 is a diagram illustrating example past weather data and operation data stored in a process data storing unit;

FIG. 8 is a diagram illustrating a low-temperature production unit price of a control-target device;

FIG. 9 is a diagram illustrating a high-temperature production unit price of the control-target device;

FIG. 15 is a diagram illustrating an optimization variable for a condition optimization;

DETAILED DESCRIPTION

A. Outline of Embodiment

[1. Electric/Thermal Energy Storage Schedule Optimizing System]

Figure 1:
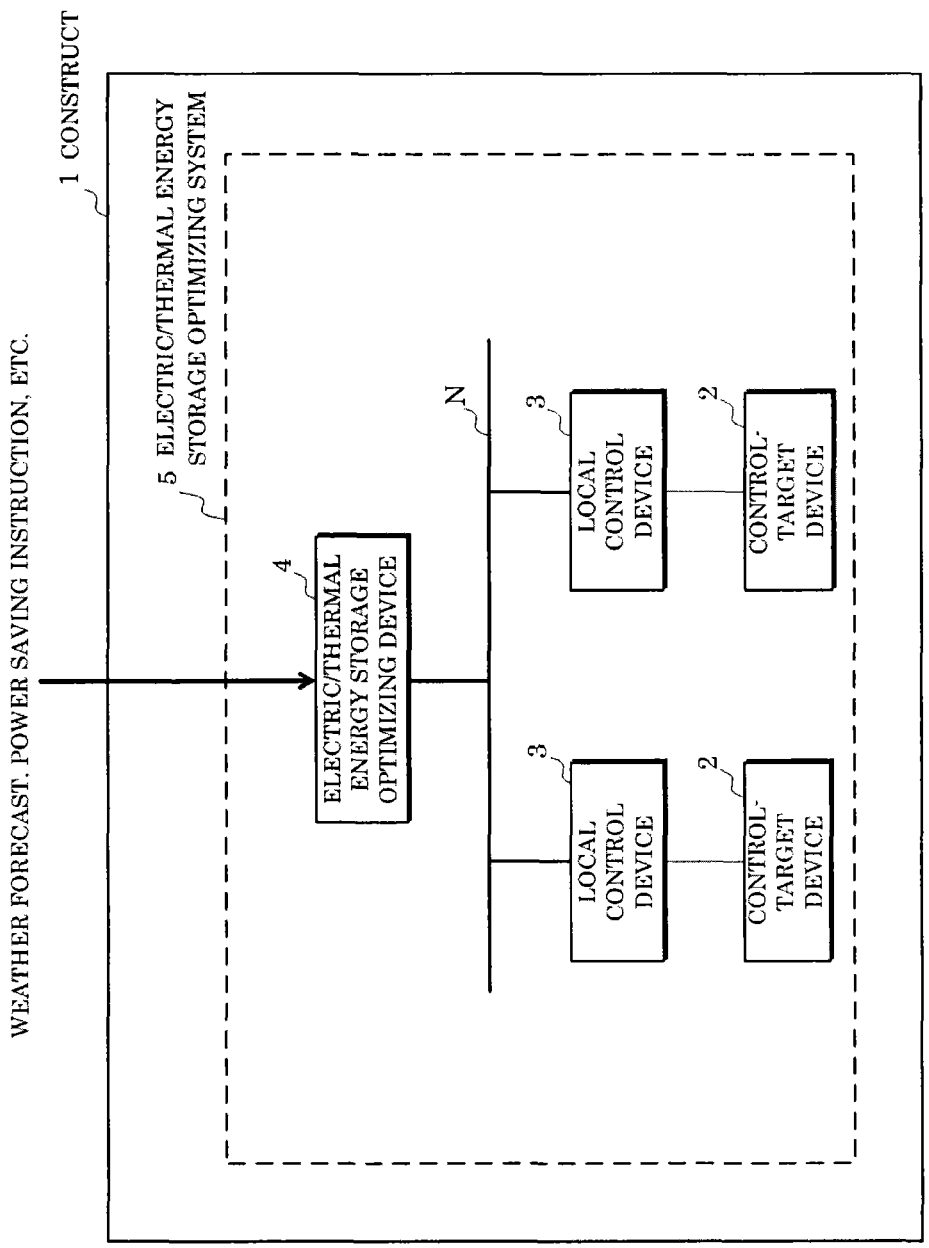
FIG. 1 is a connection configuration diagram illustrating an example electric/thermal energy storage optimizing system.

An electric/thermal energy storage schedule optimizing system according to an embodiment includes, as illustrated in FIG. 1, various control-target devices 2 installed in a construct 1, local control devices 3, and an electric/thermal energy storage schedule optimizing device 4.

The control-target devices 2 include at least one of an energy consuming device, an energy supplying device, and an energy storage device. The energy consuming device includes, for example, an air-conditioning device (air-conditioner), a lighting device, and a heat source device. The energy supplying device includes, for example, a solar power generation device (PV), a solar-powered water heater, and a CGS. The energy storage device includes a battery and a thermal storage device. A heat pump chiller, a chiller, and an absorption chiller heater, etc., to be discussed later are the energy consuming devices. The control-target devices 2 of the present embodiment include devices serving as any combination of the energy consuming device, the energy supplying device, and the energy storage device.

The local control devices 3 are connected to the respective control-target devices 2, and control the activation/deactivation, etc., of the respective control-target devices 2. The activation/deactivation may be referred to as start-stop in some cases below. The local control device 3 may be provided for each control-target device 2 or may employ a configuration of controlling the plurality of control-target device 2 collectively. The control by each local control device 3 follows an instruction given by the electric/thermal energy storage optimizing device 4 connected to each local control device 3 over a network N.

The electric/thermal energy storage schedule optimizing device 4 optimizes the electric/thermal energy storing schedule of the control-target devices 2 based on process data, setting parameters, etc. The electric/thermal energy storing schedule is information obtained by optimizing the start-stop schedule of each control-target device during a predetermined period in future and the status quantity of each control-target device.

The process data includes information from the exterior which changes as time advances, such as weather data, operation data, target values, and control setting values. The weather data includes past weather data and weather forecast data. The operation data includes past control setting value (to be discussed later) of each control-target device 2 and status quantity of each control-target device 2 when the electric/thermal energy storing schedule was executed. The target value includes a power save instruction value, a peak-shift request value, and a request value from a construct manager. The power save instruction value applied is set based on a contract or a request from an electric power company.

The control setting value is a setting value for actuating each control-target device 2. The control setting value is a parameter for setting the activation, the actuation condition, and deactivation of each control-target device 2. The control setting value is set by default, selected based on past operation data, or is set based on the electric/thermal energy storing schedule.

The control setting value includes, for example, a temperature setting value or a PMV setting value of an air-conditioner that is an energy consuming device, and the illuminance setting value of an illuminator, etc. Note that PMV is an abbreviation of predicted Mean Vote, which is defined by a thermal index ISO7730 for air-conditioning. The PMV is a numerical conversion of how a person feels frigidity, 0 means comfort, − means cold, and + means warm. The parameters utilized for calculation of the PMV are a temperature, humidity, an average radiative temperature, an amount of clothing, an activation level, and a wind speed, etc.

The control setting value also includes output and load of a CGS, an heat pump, a chiller, and an absorption chiller heater, etc., that are energy supplying devices. The control setting value further includes a charging level, a discharging level, a heat storage level, and a discharging level of a battery or a heat storage device that is an energy storage device.

The setting parameter includes various parameters utilized for the process of this embodiment, such as a process timing, a weight coefficient, an evaluation index, a device characteristic, and a threshold. The process timing includes a timing at which an optimizing unit 40 starts a process, and a timing at which a re-scheduling necessity determining unit 17 determines on the necessity of re-scheduling.

The weight coefficient is utilized for a similarity computation to be discussed later. The evaluation index is an index which should be minimized for an optimization, such as an energy consumption, a supplying energy, or a cost. The device characteristic includes various parameters defined in accordance with each device, such as rating, lower limit output, and COP of each control-target device 2.

Note that COP (coefficient of performance) is a coefficient of performance of a heat source like a heat pump chiller, and can be obtained by dividing the cooling or heating performance by power consumption. The threshold is for determining on a difference between the operation data and the control setting value. A device preference order is the preference order of the control-target device 2 which has a load level to be increased.

[2. Control-target Device]

Figure 2:
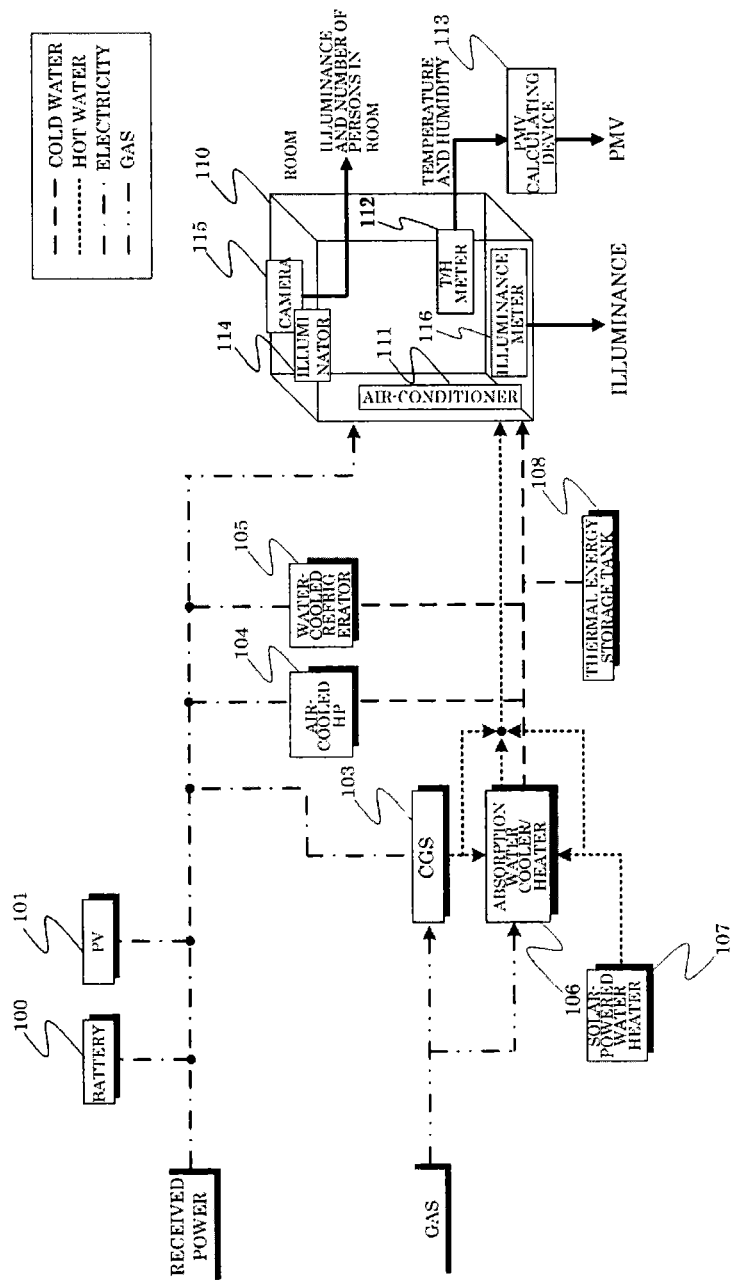
FIG. 2 is a connection configuration diagram illustrating an example configuration of control-target devices in a construct.

FIG. 2 illustrates example connection configuration of the various control-target devices 2 and the flow of energy, such as cold water, hot water, electricity, and gas. The energy exchange relationship between those control-target devices 2 is realized by supplying electricity, cold heat, or hot heat to a room with the electric power received from the exterior, and the gas supplied from the exterior being as energy sources.

The illustrated control-target devices 2 are merely examples, and it is optional which one of the control-target devices 2 is used or is not used. The present embodiment does not exclude the use of the unillustrated control-target devices 2.

Example control-target devices 2 installed are a battery 100, a PV 101, a CGS 103, an heat pump chiller 104, a refrigerator 105, an absorption chiller heater 106, a solar-powered water heater 107, and a thermal energy storage tank 108.

The battery 100 is a facility utilizing a secondary battery that can perform both charging and discharging. The PV 101 is a power-generation facility including solar panels that converts solar power into electric energy. The PV 101 is a device that changes the energy supply level in accordance with a climate condition like a weather.

The CGS (Co-Generation System) 103 is a system that can utilize, together with the power generation by an internal combustion engine or an external combustion engine, the exhausted heat thereof. The CGS 103 in this example is an electric/thermal energy supply system which generates power with the gas being as an energy source and which utilizes the exhausted heat. A fuel cell may be utilized for a power generation and as a heat source.

The Heat Pump chiller 104 supplies cold water or hot water through a phase change in a coolant with air being as a heat source. The refrigerator 105 supplies cold water through a phase change in a coolant with water being as a heat source.

The absorption chiller heater 106 has a process of absorption of vapor and regeneration by a heat source between a condenser of a coolant and an evaporator, thereby supplying cold water or hot water. Example energies for a heat source are the gas, and the exhausted heat from the CGS 103, the solar-powered water heater 107, etc.

The solar-powered water heater 107 supplies hot water using solar heat. The solar-powered water heater 107 is a device that changes the energy supply level in accordance with a climate condition like a weather. The thermal energy storage tank 108 stores heat through a reserved heat carrier. The above-explained heat pump chiller 104, refrigerator 105, absorption chiller heater 106, solar-powered water heater 107, and thermal energy storage tank 108 can supply both cold water and hot water for an air-conditioner 111.

Placed in each room 110 in the construct 1 are, for example, the air-conditioner 111, a thermometer/hygrometer (T/H METER) 112, an illuminance meter 116, an illuminator 114, and a camera 115. The air-conditioner ill and the illuminator 114 are included in the energy consuming device.

The flow of the electricity, gas, cold water, and hot water in the above-explained control-target devices 2 is as follows. That is, power received from the power system is stored in the battery 100, or is consumed by the energy consuming devices, such as the air-conditioner 111 and the illuminator 114.

The power generated by the PV 101 and the CGS 103 is also stored in the battery 100, or is consumed by the above-explained energy consuming devices. The received power and the generated power are consumed by heat source devices, such as the heat pump chiller 104 and the refrigerator 105, for heat generation.

Conversely, the gas from a gas supply system is consumed by the CGS 103, and the absorption chiller heater 106 as a fuel. The absorption chiller heater 106 can produce cold heat through hot heat produced by the solar-powered water heater 107 or the CGS 103. The absorption chiller heater 106 can supply hot heat only through gas charging. Moreover, the absorption chiller heater 106 can increase a cold heat production level through gas charging in addition to the cold heat production by hot heat.

The cold heat produced by the heat pump chiller 104, the refrigerator 105, and the absorption water chiller heater 106 is stored in the thermal energy storage tank 108, or is used by the air-conditioner 111 placed in the room 110 for air-conditioning. Moreover, the air-conditioner 111 can perform air heating by hot water produced by any one of the CGS 103, the HP 104, the absorption chiller heater 106, and the solar-powered water heater 107.

The thermometer/hygrometer (T/H METER) 112 includes a PMV calculating device 113 that calculates and outputs a PMV based on the measured temperature/humidity. In this case, parameters necessary for calculating the PMV other than the temperature and the humidity may be set by default or may be input from the exterior.

When the illuminator 114 emits light by power, the illuminance of the room 110 changes. The camera 115 placed in the room 110 is connected with an analyzing device that analyzes the illuminance of the room 110 and the number of persons present in the room based on a picked-up image. Moreover, the illuminance meter 116 placed in the room 110 may measure and output the illuminance.

B. Configuration of Embodiment

[1. Electric/Thermal Energy Storage Schedule Optimizing Device]

Figure 3:
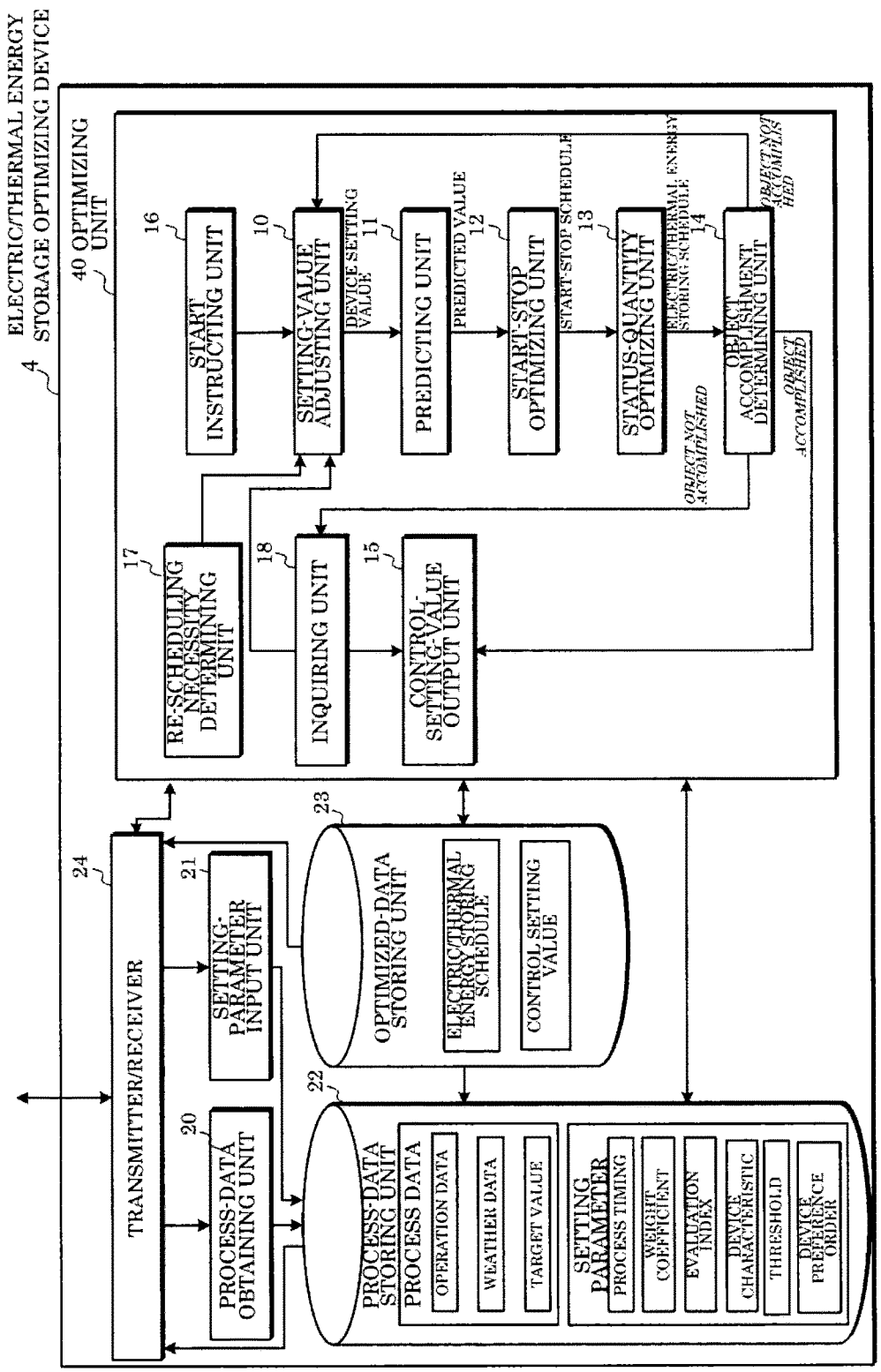
FIG. 3 is a block diagram illustrating an example configuration of an electric/thermal energy storage schedule optimizing device.
Figure 4:
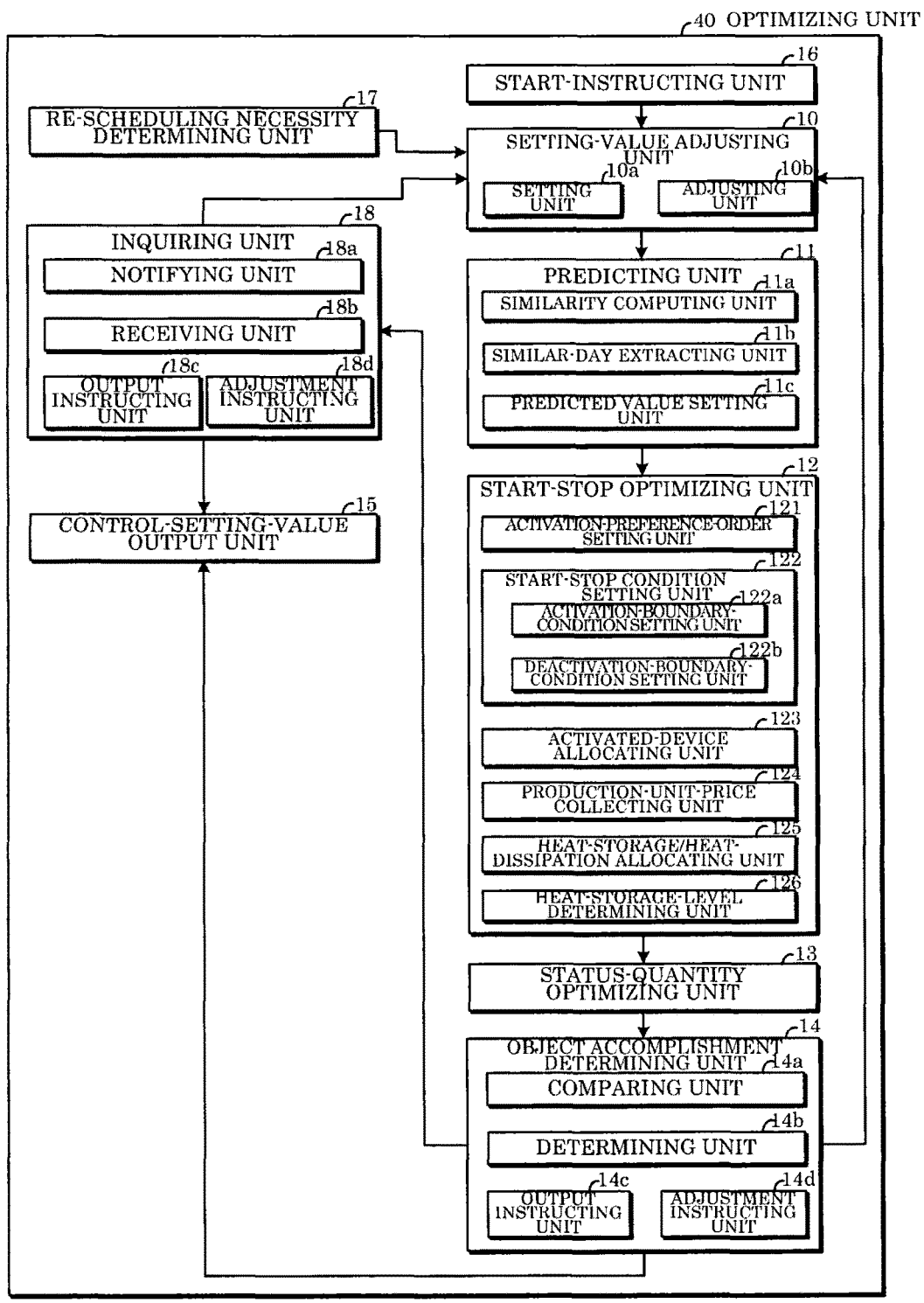
FIG. 4 is a block diagram illustrating a configuration of an optimizing process unit.

An explanation will be given of the configuration of the electric/thermal energy storage schedule optimizing device 4 of the present embodiment with reference to FIGS. 3 and 4. FIG. 3 is a block diagram illustrating the whole configuration of the electric/thermal energy storage schedule optimizing device 4, and FIG. 4 is a block diagram illustrating the optimizing unit 40.

The electric/thermal energy storage optimizing device 4 includes the optimizing unit 40, a process-data obtaining unit 20, a setting-parameter input unit 21, a process-data storing unit 22, an optimized-data storing unit 23, and a transmitter/receiver 24.

[2. Optimizing Unit]

The optimizing unit 40 optimizes the start-stop schedule of a device and the electric/thermal energy storing schedule thereof through a computation based on various pieces of process data to be discussed later. This optimizing unit 40 includes a setting-value adjusting unit 10, a predicting unit 11, a start-stop optimizing unit 12, a status-quantity optimizing unit 13, an object accomplishment determining unit 14, a control-setting-value output unit 15, an inquiring unit 18 and the re-scheduling necessity determining unit 17.

(Setting-value Adjusting Unit)

The setting-value adjusting unit 10 sets a control setting value, such as the set temperature of the air-conditioner, and the illuminance of the illuminator. As illustrated in FIG. 4, the setting-value adjusting unit 10 includes a setting unit 10a, and an adjusting unit 10b. The setting unit 10a sets a control setting value. The adjusting unit 10b adjusts the control setting value in accordance with a purpose like energy saving.

(Predicting Unit)

The predicting unit 11 predicts consumed energy or supplying energy of the control-target device 2. As illustrated in FIG. 4, the predicting unit 11 includes a similarity computing unit 11a, a similar-day extracting unit 11b, and a predicted-value setting unit 11c.

The similarity computing unit 11a computes a similarity of an execution day of the electric/thermal energy storing schedule to be optimized based on past weather data and control setting value within a predetermined time period. The similar-day extracting unit 11b extracts a day similar to the execution day of the electric/thermal energy storing schedule based on the similarity computed by the similarity computing unit 11a. The predicted-value setting unit 11c sets, as a predicted value, consumed energy or supplying energy based on operation data at the similar day extracted by the similar-day extracting unit 11b.

(Start-Stop Optimizing Unit)

The start-stop optimizing unit 12 optimizes a start-stop schedule in such a way that a predetermined evaluation index, such as the consumed energy of the control-target device 2 or the energy cost, is minimized. The start-stop optimizing unit 12 includes, as illustrated in FIG. 4, an activation-preference-order setting unit 121, a start-stop condition setting unit 122, an activation-device allocating unit 123, a production-unit-price collecting unit 124, a heat-storage/heat-dissipation allocating unit 125, and a heat-storage-level determining unit 126.

The activation-preference-order setting unit 121 sets a preference order of activating the control-target device 2 based on the evaluation index. The start-stop condition setting unit 122 sets the start-stop condition of the control-target device 2 based on the preference order, the characteristic of the control-target device 2, and the consumed energy of cold heat or hot heat. The start-stop condition includes an activation boundary condition and a deactivation boundary condition.

The activation boundary condition is a boundary condition for activating the control-target device 2. The deactivation boundary condition is a boundary condition for deactivating the activated control-target device 2. Hence, the start-stop condition setting unit 122 includes an activation-boundary-condition setting unit 122a and a deactivation-boundary-condition setting unit 122b. The activation-boundary-condition setting unit 122 sets the activation boundary condition based on the consumed energy of cold heat or hot heat. The deactivation-boundary-condition setting unit 122b sets the deactivation boundary condition.

In the present embodiment, the deactivation-boundary-condition setting unit 122b sets the deactivation boundary condition in such a manner as to be a smaller value than that of the activation boundary condition. This is because to set leeways for the respective control-target devices 2 until it becomes a value of deactivating the control-target device 2 even if the value of the consumed energy becomes smaller than the activation boundary condition. This value is referred to as a deactivation dead zone, which will be discussed later in detail.

The activation-device allocating unit 123 allocates the control-target device 2 activated at each clock time in a day based on the activation boundary condition, the deactivation boundary condition, and the predicted consumed energy. The production-unit-price collecting unit 124 computes a production unit price at each allocated clock time based on the cold heat of each control-target device 2 and the hot heat thereof.

The heat-storage/heat-dissipation allocating unit 125 allocates, in accordance with the computed production unit price, heat storage or cold heat of the thermal energy storage facilities like the thermal energy storage tank 108. The heat-storage-level determining unit 126 determines whether or not the integrated value of the heat dissipation level of the thermal energy storage facilities or the heat storage level thereof reaches the capacity of the thermal energy storage facilities.

(Status-quantity Optimizing Unit)

The status-quantity optimizing unit 13 optimizes, based on the evaluation index, the successive status quantities like a supplied heat level of each control-target device 2 having the start-stop operation set based on the start-stop schedule, thereby obtaining the electric/thermal energy storing schedule.

(Object Accomplishment Determining Unit)

The object accomplishment determining unit 14 determines whether or not the optimized electric/thermal energy storing schedule satisfies a target value. The target value includes a power saving instruction value, a peak-shift request value, and a request value from a manager of a construct.

The object accomplishment determining unit 14 includes a comparing unit 14a, a determining unit 14b, an output instructing unit 14c, and an adjustment instructing unit 14d. The comparing unit 14a compares the optimized electric/thermal energy storing schedule with an object.

The determining unit 14b determines whether or not the electric/thermal energy storing schedule satisfies a target value based on the comparison result by the comparing unit 14a. The output instructing unit 14c instructs the control-setting-value output unit 15 to output a control setting value for the electric/thermal energy storing schedule determined as satisfying the target value by the determining unit 14b. The adjustment instructing unit 14d instructs the setting-value adjusting unit 10 to adjust again the setting value when the determining unit 14b determines that the target value is not satisfied.

(Control-setting-value Output Unit)

The control-setting-value output unit 15 generates a control setting value for each control-target device 2 based on the electric/thermal energy storing schedule, and outputs the control setting value to each local control device 3.

(Start Instructing Unit)

A start instructing unit 16 causes the optimizing unit 40 to start an optimizing process at a preset timing. When, for example, the electric/thermal energy storing schedule is set on the previous day to the execution day, a predetermined clock time in each day can be a setting timing. The cycle of such a setting timing can be set freely like for each several day, and the predetermined time clock can be also set freely to any time.

(Re-scheduling Necessity Determining Unit)

The re-scheduling necessity determining unit 17 compares the control setting value based on the electric/thermal energy storing schedule with actual operation data at a preset timing, thereby determining on the necessity of the re-scheduling.

For example, the re-scheduling necessity determining unit 17 compares the control setting value with the operation data for each 30 minutes on the execution day of the electric/ thermal energy storing schedule, and determines that the re-scheduling is necessary when there is a difference exceeding a predetermined threshold. The cycle of such timing can be also set freely.

(Inquiring Unit)

The inquiring unit 18 inquires the local control device 3 whether or not to accept the electric/thermal energy storing schedule when the object accomplishment determining unit 14 determines that it is difficult to accomplish the object based on the result of a re-scheduling.

The inquiring unit 18 includes a notifying unit 18a, a receiving unit 18b, an output instructing unit 18c, and an adjustment instructing unit 18d. The notifying unit 18a notifies the local control device 3 of the object and the electric/thermal energy storing schedule. The receiving unit 18b receives a response from the local control device 3 to the effect whether or not to accept.

The output instructing unit 18c instructs the control-setting-value output unit 15 to output the control setting value when the receiving unit 18b receives an acceptance response. The adjustment instructing unit 18d instructs the setting-value adjusting unit 10 to re-adjust the setting value when the receiving unit 18b receives a response that cannot be accepted.

[3. Process-data Obtaining Unit]

The process-data obtaining unit 20 obtains process data from the exterior. Example process data obtained are operation data, weather data, and a target value, etc., as explained above.

[4. Setting-parameter Input Unit]

The setting-parameter input unit 21 inputs setting parameters. Example setting parameters are a process timing, a weight coefficient, an evaluation index, a device characteristic, a threshold, and a device preference order, etc., as explained above.

[5. Process-data Storing Unit]

The process-data storing unit 22 stores necessary data for the process by the optimizing unit 40, such as the process data and the setting parameters. The process-data storing unit 22 stores, in addition to the above-explained examples, necessary information for the processes by the respective units. For example, the arithmetic expressions for the respective units, and parameters are stored. Hence, the electric power unit price and the gas unit price, etc., for obtaining a production unit price are stored in the process-data storing unit 22.

[6. Optimized-data Storing Unit]

The optimized-data storing unit 23 stores data obtained through the optimizing process by the optimizing unit 40. For example, the optimized-data storing unit 23 stores the electric/thermal energy storing schedule and the control setting value, etc. The data stored by the optimized-data storing unit 23 can be stored in the process-data storing unit 22 or can be utilized for the computation processes by the respective units in the optimizing unit 40 as past operation data.

[7. Transmitter/Receiver]

The transmitter/receiver 24 exchanges information between the electric/thermal energy storage optimizing device 4 and the local control device 3, the terminal of a manager of a construct, a master monitoring-controlling device, and a server that provides weather information, etc., via the network N. When the data stored in the process-data storing unit 22 and the optimized-data storing unit 23 is transmitted by the transmitter/receiver 24, the above-explained external devices become available.

The electric/thermal energy storage optimizing device 4 includes an input unit for inputting necessary information for the process by each unit, and for inputting a selection or an instruction of the process, an interface for an information inputting, and an output unit that outputs a process result, etc.

Example input units are input devices currently available, such as a keyboard, a mouse, a touch panel, and a switch, or input devices available in future. The input unit can also function as the above-explained setting-parameter input unit 21. Example output units are output devices currently available, such as a display device, and a printer, or all output devices available in future. The data stored in the process-data storing unit 22 and in the optimized-data storing unit 23 can be displayed, etc., by the output unit so that an operator can refer the displayed data.

C. Action of Embodiment

The procedures of the optimizing process according to the above-explained embodiment will now be explained with reference to FIGS. 5 to 19.

[1. Process of Optimizing Next Day's Operation Schedule on Night Before Current Day]

The process by the electric/thermal energy storage optimizing device 4 will be explained with reference to FIG. 5. The process explained below is, for example, an optimization of the next day's electric/thermal energy storing schedule of the control-target devices 2 in the construct 1 on the night before the current day. It is appropriate if the electric/thermal energy storing schedule to be optimized is a future predetermined time period, and is not limited to only the next and one day.

[1-1. Optimization Execution Starting Process]

First, the start instructing unit 16 instructs the setting-value adjusting unit 10 to execute the optimizing process at a preset clock time. When, for example, it becomes 21 O'clock on the night before the current day, the optimizing unit 40 starts executing the optimizing process. The flowchart of FIG. 5 illustrates the process flows after the execution of the optimizing process is started upon the instruction from the start instructing unit 16.

[1-2. Setting-value Adjusting Process]

The setting unit 10a of the setting-value adjusting unit 10 sets the next day's control setting values in the construct 1 (step S01). The control setting values include, for example, the temperature setting value of the air-conditioner, the PMV setting value, and the illuminance setting value. The setting unit 10a sets, as the control setting values, for example, the latest control setting values or the most frequent control setting value among the pieces of operation data stored in the process-data storing unit 22 within a predetermined time period. The setting unit 10a can also set the control setting values that are setting values input through the input unit.

[1-3. Energy Predicting Process]

The predicting unit 11 predicts the consumed energy of the control-target devices 2 or the supplying energy thereto based on the weather data and the operation data within a past predetermined time period stored in the process-data storing unit 22 (step S02).

An explanation will be given of an example predicting process by the predicting unit 11. FIG. 6 illustrates the weather data and the operation data which are past days in a week, weathers, temperatures and humidity, and control setting values stored in the process-data storing unit 22 and collected as a table. The reason why the days in a week are included is that depending on the construct 1, there are, for example, few people on Saturday and Sunday, and thus there is a tendency of energy consumption depending on the day in a week. The control setting values are the PMV setting value or the PMV measured value, the illuminance setting value or the illuminance measured value as examples.

The similarity computing unit 11a of the predicting unit 11 computes the similarity to the weather data and the control setting value set based on the next day's weather forecast, etc., on the basis of the above-explained past data. This computation can be accomplished by, for example, the following formula 1.

SIMILARITY=|WEIGHTING BY DAY IN WEEK|+ |WEIGHTING BY WEATHER|+$a$×|MAXIMUM TEMPERATURE OF NEXT DAY- $TM_i$|+$b$×|MINIMUM TEMPERATURE OF NEXT DAY-$TL_i$|+$c$×|RELATIVE HUMIDITY OF NEXT DAY-$RH_i$|+$d$×|PMV SETTING OF NEXT DAY-$PMV_i$|+$e$×|ILLUMINATION SETTING OF NEXT DAY-$L_i$|→min        [FORMULA 1]

($i$=1, 2, 3, . . . , n−1, n)

The "weighting by day" applied is a weight coefficient set in advance for each day. Likewise, the "weighting by weather" applied is a weight coefficient set in advance for each weather kind. When, for example, the weather based on the next day's weather forecast is "sunny", and when the past data is "sunny", the weight coefficient becomes small, but when the past data is "rainy", the weight coefficient becomes large. The "weighting by day" and the "weighting by weather", and weight coefficients of respective factors, such as a, b, c, d, and e, are input from the setting-parameter input unit 21, and ones stored in the process-data storing unit 22 may be set arbitrary in accordance with the prediction precision.

The similar-day extracting unit 11b extracts a day number having the smallest similarity based on the similarity obtained by the similarity computing unit 11a. The day number is a serial number allocated to the pieces of operation data stored in the operation-data storing unit 21 and arranged for each day.

The predicted-value setting unit 11c sets, as the next day's predicted value, the consumed energy of the control-target devices 2 or the supplying energy thereto at a date corresponding to the day number extracted by the similar-day extracting unit 11b.

[1-4. Device Start-stop Optimizing Process]

Next, the start-stop optimizing unit 12 optimizes the start-stop schedule of the control-target devices 2 based on the predicted value set by the predicting unit 11. The detail of the process by the start-stop optimizing unit 12 will be explained with reference to the flowchart of FIG. 7. A topic index for the optimization can be selected arbitrary from the several patterns as will be discussed later. In this example, however, an explanation will be given of an example case in which the cost is selected as the minimization index.

(Activation-preference-order Setting Process)

That is, the activation-preference-order setting unit 121 of the start-stop optimizing unit 12 sets the preference order of activating the control-target devices 2 (step S21). FIG. 8 illustrates an example cold-heat production unit price table used for setting the activation preference order of the control-target devices 2.

The cold-heat production unit price table is obtained by setting multiple cases as supply conditions of the control-target devices 2 that supply cold heat, calculating a unit price for each case when the cold heat [kWh] of a unit quantity is produced, and collecting such unit prices in table. For each control-target device 2, a corresponding field is denoted with a circle mark when the cold heat is supplied, and the unit price of that case will be denoted at the bottom of the table.

The cold heat production unit price can be obtained by, for example, the following formulae 2 to 7.

(Cold Heat Production Unit Price)

FIRST CASE        [FORMULA 2]
(WATER-COOLED REFRIGERATOR) =

$$E_{UP} \times \frac{1}{COP_R}$$

SECOND CASE (AIR-COOLED HP) =        [FORMULA 3]

$$E_{UP} \times \frac{1}{COP_{HP-C}}$$

THIRD CASE        [FORMULA 4]
(CGS POWER GENERATION INVARIABLE+ ABSORPTION) =

$$G_{UP} \times \left(\frac{100}{COP_{ABR-CH} \times \eta_{CGS-H} \times G_{UH}}\right)$$

FOURTH CASE        [FORMULA 5]
(CGS POWER GENERATION VARIABLE+ ABSORPTION) =

$$G_{UP} \times \left(\frac{100}{COP_{ABR-CH} \times \eta_{CGS-H} \times G_{UH}}\right) - E_{UP} \times \frac{\eta_{CGS-E}}{COP_{ABR-CH} \times \eta_{CGS-H}}$$

FIFTH CASE        [FORMULA 6]
(ABSORPTION+USE SOLAR HEAT) ≈ 0

SIXTH CASE (ABSORPTION+USE GAS) =        [FORMULA 7]

$$G_{UP} \times \frac{1}{COP_{ABR-CG} \times G_{UH}}$$

$E_{up}$: POWER UNIT PRICE [YEN/kWh]
$G_{up}$: GAS UNIT PRICE [YEN/Nm$^3$]
$COP_R$: REFRIGERATOR COP
$COP_{HP-C}$: HEAT PUMP CHILLER COP (WHEN PRODUCING COLD WATER)
$COP_{ABR-CH}$: ABSORPTION CHILLER HEATER COP (WHEN PRODUCING COLD WATER, USING SOLAR HEAT OR EXHAUSTED HEAT)
$COP_{ABR-CQ}$: ABSORPTION CHILLER HEATER COP (WHEN PRODUCING COLD WATER, USING GAS)
$\eta_{CGS-E}$: CSG POWER GENERATION EFFICIENCY [%]
$\eta_{CGS-H}$: CSG HEAT RECOVERY EFFICIENCY [%]
$G_{UH}$: GAS LOW-ORDER HEAT GENERATION LEVEL [kwh/Nm$^3$]

The third case is a cold heat production unit price when power generated by the CGS 103 is invariable. The term "invariable" means a case in which the power generated by the CGS 103 is not used effectively such that most energy consuming devices are not activated and the power demand is extremely small.

Conversely, the fourth case is a cold heat production unit price when the power generated by the CGS 103 is variable. The term "variable" means a case in which the power generated by the CGS 103 is effectively consumed and the equivalent power purchase can be cut.

Moreover, the fifth case is a cold heat production unit price when the hot water output by the solar-powered water heater 107 is utilized for the absorption chiller heater 106. Hence, no fuel, etc., is consumed, and the cost becomes substantially zero. In practice, slight power is consumed due to the operation of accessories. However, since this value is extremely small, it is not taken into consideration.

FIG. 9 illustrates an example hot-heat production unit price table used for setting the activation preference order of the control-target devices 2. The hot-heat production unit price table is obtained by setting multiple cases as supply conditions of the control-target devices 2 that supply hot heat, calculating a unit price for each case when hot heat [kWh] of a unit quantity is produced, and collecting such unit prices in table.

The hot heat production unit price can be obtained by, for example, the following formulae 8 to 12.

(Hot Heat Production Unit Price)

$$\text{FIRST CASE (AIR-COOLED } HP) = E_{UP} \times \frac{1}{COP_{HP-H}} \quad \text{[FORMULA 8]}$$

$$\begin{aligned}\text{SECOND CASE} \quad & \text{[FORMULA 9]}\\ (CGS \text{ POWER GENERATION INVARIABLE}) = \\ & G_{UP} \times \left(\frac{100}{\eta_{CGS-H} \times G_{UH}}\right)\end{aligned}$$

$$\begin{aligned}\text{THIRD CASE} \quad & \text{[FORMULA 10]}\\ (CGS \text{ POWER GENERATION VARIABLE}) = \\ & G_{UP} \times \left(\frac{100}{\eta_{CGS-H} \times G_{UH}}\right) - E_{UP} \times \frac{\eta_{CGS-E}}{\eta_{CGS-H}}\end{aligned}$$

$$\text{FOURTH CASE (USE SOLAR HEAT)} = 0 \quad \text{[FORMULA 11]}$$

$$\begin{aligned}\text{FIFTH CASE (ABSORPTION + USE GAS)} = \quad & \text{[FORMULA 12]}\\ G_{UP} \times \frac{1}{COP_{ABR-HG} \times G_{UH}}\end{aligned}$$

$COP_{HP-H}$: HEAT PUMP CHILLER COP (WHEN PRODUCING HOT WATER)

$COP_{ABR-HR}$: ABSORPTION CHILLER HEATER COP (WHEN PRODUCING HOT WATER, USING GAS)

The activation-preference-order setting unit 121 sets the activation preference order using those tables in an order of the device having the smaller evaluation index. The evaluation index is a cost in this example. In the example case of the above-explained cold-heat production unit price table, the preference cases are the fifth case, the first case, the fourth case, the second case, the sixth case, and the third case, in this order.

Hence, when there is a stable output by the solar-powered water heater 107, the activation preference order of the control-target devices 2 that supply cold heat follows an order of the following (1) to (5). This is a condition in which sufficient solar light is obtainable like a sunny condition is continued.

(1) Absorption chiller heater 106 (utilizing solar heat)
(2) refrigerator 105
(3) CGS 103 and Absorption chiller heater 106 (utilizing CGS exhausted heat, however, remaining power is reserved when solar heat is utilized)
(4) Heat pump chiller 104
(5) Absorption chiller heater 106 (utilizing gas)

When there is no output by the solar-powered water heater 107, the following order from (1) to (4) is applied.

(1) refrigerator 105
(2) Absorption chiller heater 106 (utilizing CGS exhaust gas)
(3) Heat pump chiller 104
(4) Absorption chiller heater 106 (utilizing gas)

As explained above, the activation-preference-order setting unit 121 calculates the production unit price of the cold heat and the hot heat of each control-target device 2, thereby setting the activation preference order of the control-target devices 2 used for supplying cold heat or hot heat. In the cases in which the evaluation index subjected for minimization is other than the cost, it is also appropriate to set the activation preference order of the control-target devices 2 in an order from the smaller evaluation index like the same scheme.

(Start-stop Condition Setting Process)

Next, the start-stop condition setting unit 122 calculates the start-stop condition of the control-target device 2 in accordance with the cold heat and hot heat consumed energy based on the activation preference order set by the activation-preference-order setting unit 121 (step S22).

Figure 10:
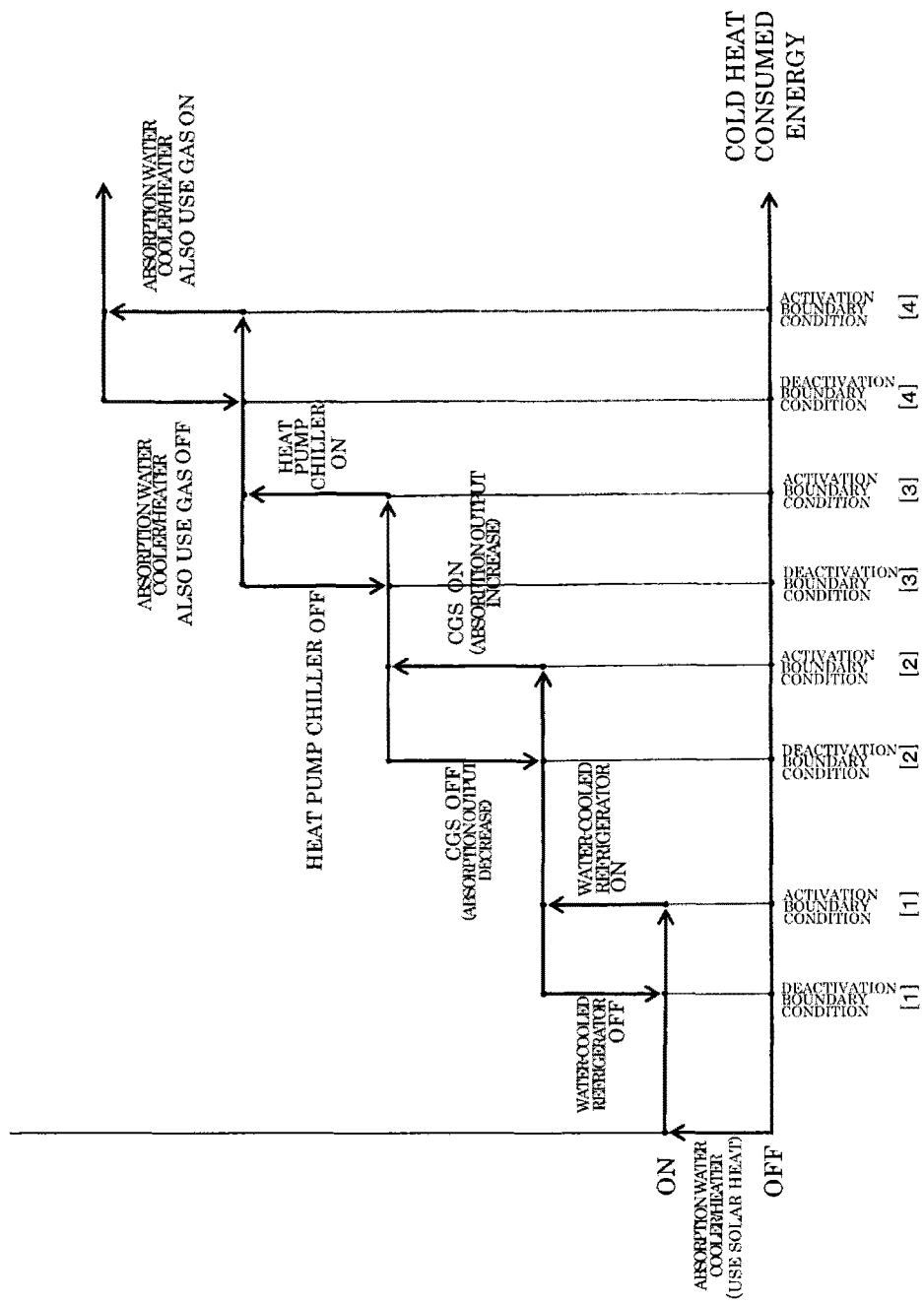
FIG. 10 is a diagram illustrating an activation order of control-target devices and a start-stop condition thereof.

FIG. 10 illustrates an example start-stop condition. FIG. 10 illustrates an example start-stop condition of the cold heat supplying device in accordance with the cold heat consumed energy when a stable output by the solar-powered water heater 107 is expected.

First, the activation-boundary-condition setting unit 121a obtains the activation boundary condition for activating each control-target device 2 in accordance with an increase of the cold heat consumed energy. This activation boundary condition can be defined by, for example, the following formulae 13 to 16.

(Activation Boundary Condition [1], Activation of Refrigerator)

$$\text{COLD HEAT DEMAND} \geq H_{ABR-CH} \times r_{ABR-SH} \quad \text{[FORMULA 13]}$$

(Activation Boundary Condition [2], Activation of CGS)

$$\text{COLD HEAT DEMAND} \geq H_{ABR-CH} \times r_{ABR-SH} + H_R \quad \text{[FORMULA 14]}$$

(Activation Boundary Condition [3], Activation of Heat Pump Chiller)

$$\begin{aligned}\text{COLD HEAT DEMAND} \geq & H_{ABR-CH} \times r_{ABR-SH} + H_R + \\ & (H_{ABR-CH} - H_{ABR-CH} \times r_{ABR-SH})\end{aligned} \quad \text{[FORMULA 15]}$$

(Activation Boundary Condition [4], Activation of Absorption Chiller Heater (Using Gas))

$$\begin{aligned}\text{COLD HEAT DEMAND} \geq & H_{ABR-CH} \times r_{ABR-SH} + H_R + \\ & (H_{ABR-CH} - H_{ABR-CH} \times r_{ABR-SH}) + H_{HP-C}\end{aligned} \quad \text{[FORMULA 16]}$$

$H_{ABR-CH}$: RATED COOLING LEVEL OF ABSORPTION CHILLER HEATER [kWh]

$r_{ABR-SH}$: LOADING FACTOR PREDICTED VALUE OF ABSORPTION CHILLER HEATER WHEN USING SOLAR HEAT (>LOWER-LIMIT LOADING FACTOR)

$H_R$: RATED COOLING LEVEL OF REFRIGERATOR [kWh]

$H_{HP-C}$: RATED COOLING LEVEL OF HEAT PUMP CHILLER [kWh] (WHEN PRODUCING COLD WATER)

An activation boundary condition [1] is an activation condition for the refrigerator 105. This activation condition is a case in which the cold heat consumed energy becomes equal to or larger than the output by the absorption chiller heater 106 utilizing solar heat.

An activation boundary condition [2] is an activation condition for the CGS 103. This activation condition is a case in which the cold heat consumed energy becomes equal to or larger than the total of the output by the absorption chiller heater 106 utilizing solar heat and the rating of the refrigerator 105.

An activation boundary condition [3] is an activation condition for the absorption chiller heater 106. This activation condition is a case in which it becomes equal to or larger than a total of the activation boundary condition [2] with a difference between the rated cooling level of the absorption chiller heater 106 and the increase of the output by the absorption chiller heater 106 by the CGS 103.

An activation boundary condition [4] is a case in which it becomes equal to or larger than a total of the activation boundary condition [3] and the rated cooling quantity of the heat pump chiller 104. As explained above, the activation boundary condition is defined by adding the rated output by each control-target device 2 in an order of a higher activation preference order.

Next, the deactivation-boundary-condition setting unit 122b obtains a deactivation boundary condition for deactivating each control-target device 2. This deactivation boundary condition can be defined by, for example, the following formulae 17 to 20.

(Deactivation Boundary Condition [1], Deactivation of Refrigerator)

COLD HEAT DEMAND≤ACTIVATION BOUNDARY CONDITION [1]−$\Delta H_R$     [FORMULA 17]

(Deactivation Boundary Condition [2], Deactivation of CGS)

COLD HEAT DEMAND≤ACTIVATION BOUNDARY CONDITION [2]−$\Delta H_{ABR-CH}$     [FORMULA 18]

(Deactivation Boundary Condition [3], Deactivation of HP)

COLD HEAT DEMAND≤ACTIVATION BOUNDARY CONDITION [3]−$\Delta H_{HP-C}$     [FORMULA 19]

(Deactivation Boundary Condition [4], Deactivation of Absorption Chiller Heater (Using Gas))

COLD HEAT DEMAND≤ACTIVATION BOUNDARY CONDITION [4]−$\Delta H_{ABR-CG}$     [FORMULA 20]

$\Delta H_R$: DEACTIVATION DEAD ZONE SETTING FOR REFRIGERATOR
$\Delta H_{ABR-CH}$: DEACTIVATION DEAD ZONE SETTING FOR ABSORPTION CHILLER HEATER (WHEN PRODUCING COLD WATER, USING EXHAUSTED HEAT)
$\Delta H_{HP}$: DEACTIVATION DEAD ZONE SETTING FOR HEAT PUMP CHILLER (PRODUCING COLD WATER)
$\Delta H_{ABR-CG}$: DEACTIVATION DEAD ZONE SETTING FOR ABSORPTION CHILLER HEATER (WHEN PRODUCING COLD WATER, USING GAS)

Deactivation boundary conditions [1] to [4] for each control-target device 2 are slightly smaller values than the respective activation boundary conditions [1] to [4]. Accordingly, a deactivation dead zone is set for the deactivation boundary condition [1] to [4] for each control-target device 2. This is $\Delta H_R$, $\Delta H_{ARR-CH}$, $\Delta H_{HP-C}$, and $\Delta H_{ABR-CG}$ in the formulae 17 to 20.

The deactivation dead zone is a width or an area set between the activation boundary condition and the deactivation boundary condition. A condition in which the control-target device 2 is in a deactivation dead zone means that the control-target device is once activated based on the activation condition and, when it becomes equal to or smaller than the activation condition again, maintains the activated condition without being affected by becoming equal to or smaller than the activation condition. Hence, such a condition can be regarded as a hysteresis.

By setting the deactivation dead zone, even if the cold heat consumed energy minutely varies around the boundary, it becomes possible to avoid an operation plan that causes the control-target device 2 to excessively start and stop around the boundary.

The setting of the deactivation boundary condition is carried out within a range that is not lower than the lower-limit output by each control-target device 2. This reason will be explained below. That is, each control-target device 2 has a lower-limit output. Accordingly, depending on the setting value of the deactivation dead zone, energy supply level may become excessive around the activation boundary and deactivation boundary areas, and the energy may be surplus. Hence, in order to suppress such a surplus energy supply level, it is necessary to restrain the deactivation dead zone setting value for each control-target device 2. The following formulae 17' to 20' define the deactivation dead zone in consideration of such a restraint.

$\Delta H_R \leq H_{ABR-CH} \times r_{ABR-SH} - H_{ABR-CH-min} - H_{R-min}$     [FORMULA 17']

$\Delta H_{ABR-CH} \leq H_R - H_{R-min}$     [FORMULA 18']

$\Delta H_{HP-C} \leq H_{ABR-CH} - H_{ABR-CH} \times r_{ABR-CH} - H_{HP-min}$     [FORMULA 19']

$\Delta H_{ABR-CG} \leq H_{HP} - H_{HP-min} - H_{ABR-CG-min}$     [FORMULA 20']

$H_{ABR-CH-min}$: LOWER-LIMIT OUTPUT OF ABSORPTION CHILLER HEATER (WHEN PRODUCING COLD WATER, USING EXHAUSTED HEAT)
$H_{R-min}$: LOWER-LIMIT OUTPUT OF REFRIGERATOR
$H_{HP-min}$: LOWER-LIMIT OUTPUT OF HEAT PUMP CHILLER (WHEN PRODUCING COLD WATER)
$H_{ABR-CG-min}$: LOWER-LIMIT OUTPUT OF ABSORPTION CHILLER HEATER (WHEN PRODUCING COLD WATER, USING GAS)

An explanation will be given of such a restraint for an example case that is the formula 17' relating to the deactivation dead zone setting value for the refrigerator. In FIG. 10, it is presumed that when the cold heat consumed energy at the demanding end gradually decreases and it becomes the same quantity as that of the activation boundary condition [1], the refrigerator 105 is operated at the lower-limit output.

A case in which the cold heat consumed energy at the demanding end further decreases from this condition will be discussed. In this case, since the refrigerator 105 is operated at the lower-limit output, the output cannot be reduced anymore. Accordingly, in order to maintain the demand-supply balance of the energy, it is necessary to regulate the output by the control-target device 2 having an one-order-higher activation preference order. In the example case illustrated in FIG. 10, the output by the absorption chiller heater 106 at the one-stage-lower end is regulated.

Next, it is presumed that the cold heat consumed energy at the demanding end further decreases and becomes close to the deactivation boundary condition [1]. In this case, it is presumed that the deactivation dead zone $\Delta H_R$ is equal to or higher than the output adjusting width ($H_{ABR-CH} \times r_{ABR-SH} - H_{ABR-CH-min}$) of the absorption chiller heater 106.

In this case, both refrigerator 105 and absorption chiller heater 106 will be the lower-limit output in accordance with the reduction of the cold heat consumed energy, and thus the supply level unavoidably becomes excessive. In order to avoid such a case, in the formulae 17' to 20', a restraint is added to the deactivation dead zone setting.

Moreover, at the last terms in the formulae 17' to 20', the lower-limit outputs by the respective control-target devices 2 are subtracted. This is because there is a case in which the corresponding control-target device 2 becomes the lower-limit output and there is also a case in which the corresponding control-target device 2 does not become the lower-limit output in the example activation boundary condition explained above.

The deactivation dead zone is set as explained above in accordance with the necessity of avoiding an excessive start and stop of the control-target device 2. Accordingly, it is appropriate if the deactivation dead zone is set to a value that can accomplish the object of avoiding the excessive start and stop.

Conversely, when the deactivation dead zone is a large value, the possibility that the output by the control-target device 2 with a higher activation preference order is regulated becomes high. Hence, in order to utilize the control-target device 2 with a higher activation preference order as effective as possible, it is desirable that the deactivation dead zone of each control-target device 2 should be a small value as long as it does not result in an excessive start and stop.
(Activation-device Allocating Process)

Next, the activation-device allocating unit 123 allocates the control-target device 2 to be activated at each clock time based on the start-stop condition (activation boundary condition and deactivation boundary condition) set by the star-stop condition setting unit 122 and the predicted value predicted by the predicting unit 11 (step S23).

Figure 11:
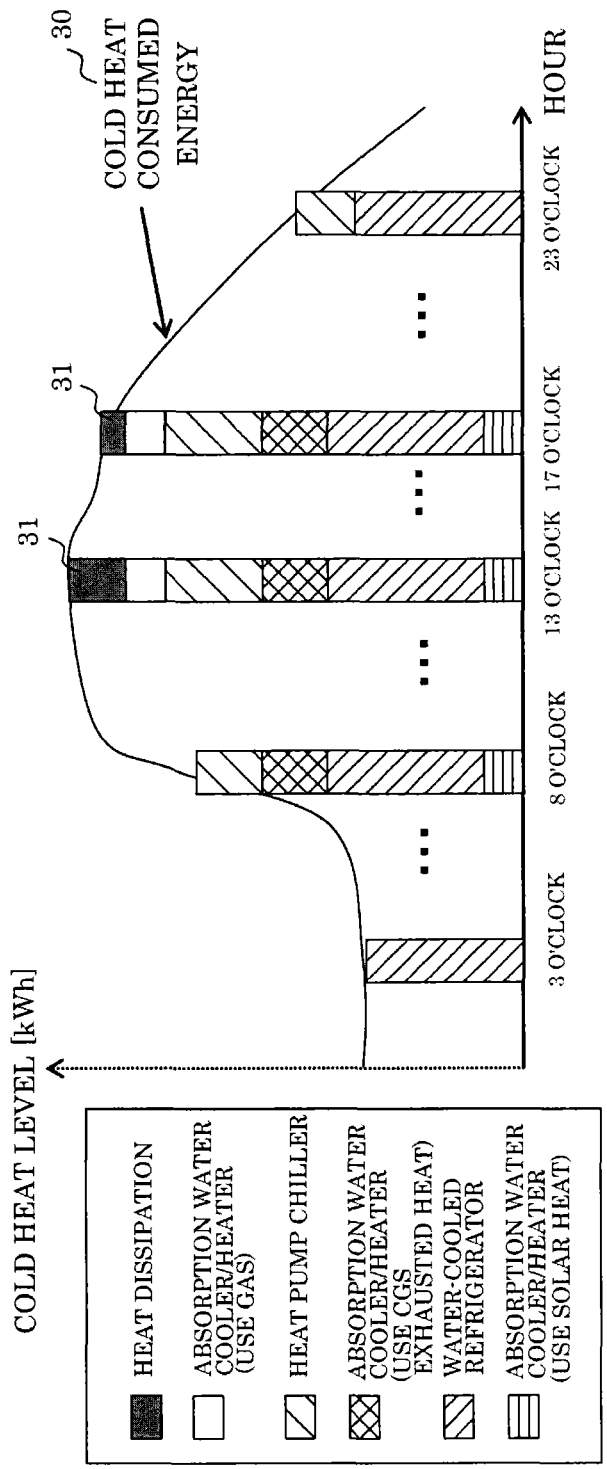
FIG. 11 is a diagram illustrating an allocation of a control-target device at each clock time.

An example allocation is illustrated in FIG. 11. This is an example case in which the control-target devices 2 to be activated are allocated to the cold heat consumed energy. There may be a case in which cold heat consumed energy and hot heat consumed energy are both present during an intermediate time period between a summer (cooling cycle) and a winter (warming cycle). In this case, the control-target devices 2 to be activated can be allocated in an order of a larger heat consumed energy.

Reference numeral 30 in FIG. 11 is a cold heat consumed energy of a whole next day predicted by the predicting unit 11. The activation-device allocating unit 123 sets the control-target device 2 operated at each clock time and a distribution of cold heat quantity borne by each control-target device 2 based on the above-explained start-stop condition in such a way that the cold heat consumed energy 30 at each time clock is satisfied.

FIG. 11 illustrates an example case in which the allocation of the control-target device 2 to be activated is piled up in an order of the device having a higher activation preference order at an arbitrary clock time. There may be a time slot at which the supply level does not reach the cold heat consumed energy 30 even if all control-target devices are allocated. In this case, the activation-device allocating unit 123 allocates heat dissipation 31 from the thermal energy storage tank 108 to the time slot at which the supply level is insufficient (step S24). It is possible to allocate discharging from the battery 100 to that time slot.
(Production-unit-price Collecting Process)

The production-unit-price collecting unit 124 computes a cold heat production unit price for each clock time (step S25). The cold heat production unit price is a unit price for producing cold heat. For example, the necessary cost for producing cold heat by 1 kWh is a cold heat production unit price. This computation is carried out to decide an activated device in consideration of the heat dissipation by the thermal energy storage facilities like the thermal energy storage tank 108 and the heat storage thereof.

Figure 12:
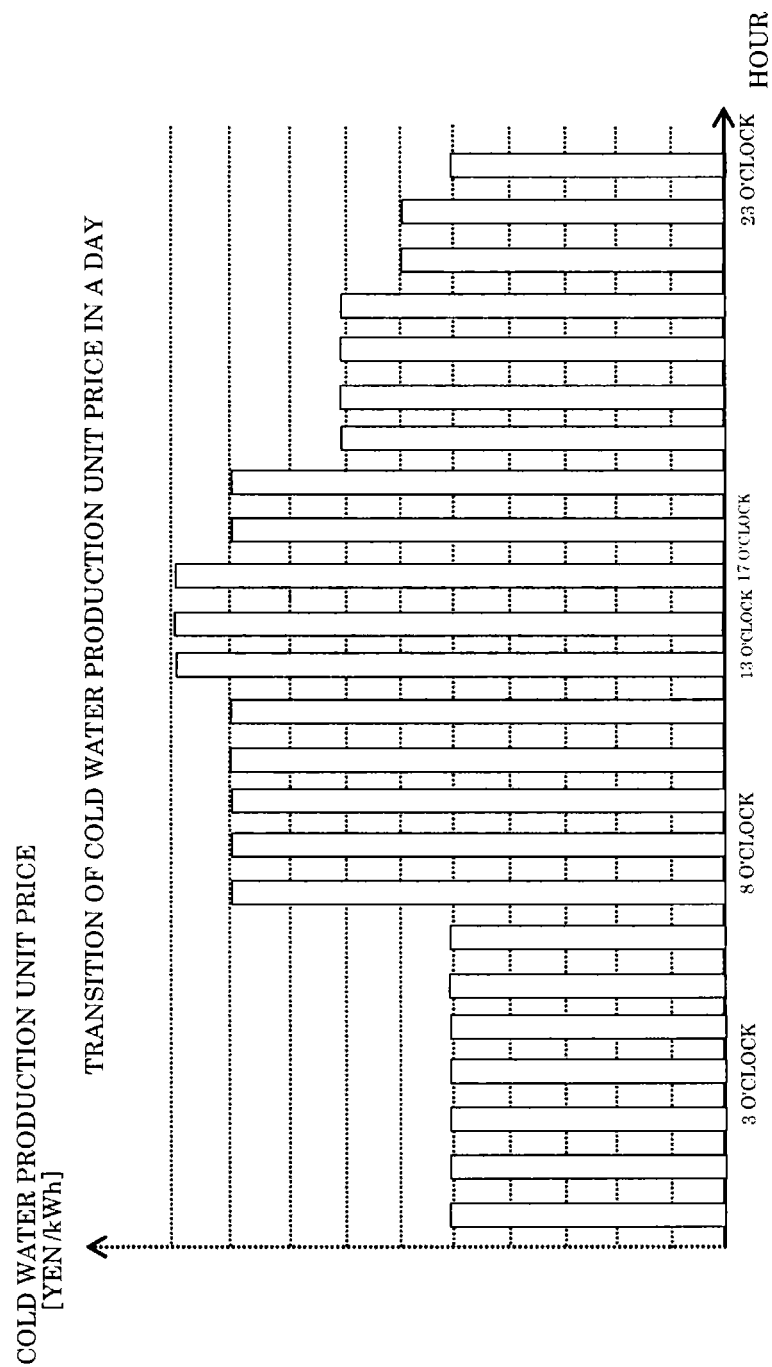
FIG. 12 is a diagram illustrating an example cold water production unit price in a day.

The cold heat production unit price at each clock time is a cold water production unit price of the control-target device 2 with the lowest activation preference order among the control-target devices 2 to be activated at that clock time. This is because such a control-target device 2 has the highest unit price and is the target whose output should be regulated at first in accordance with the decrease of the consumed energy. This control-target device 2 is allocated at the uppermost stage in FIG. 11. The cold heat production unit price of each control-target device 2 is the same as those exemplified in FIGS. 8 and 9. FIG. 12 illustrates cold water production unit prices decided in this manner and arranged in a time series of a day.
(Heat-storage/Heat-dissipation Allocating Process)

Figure 13:
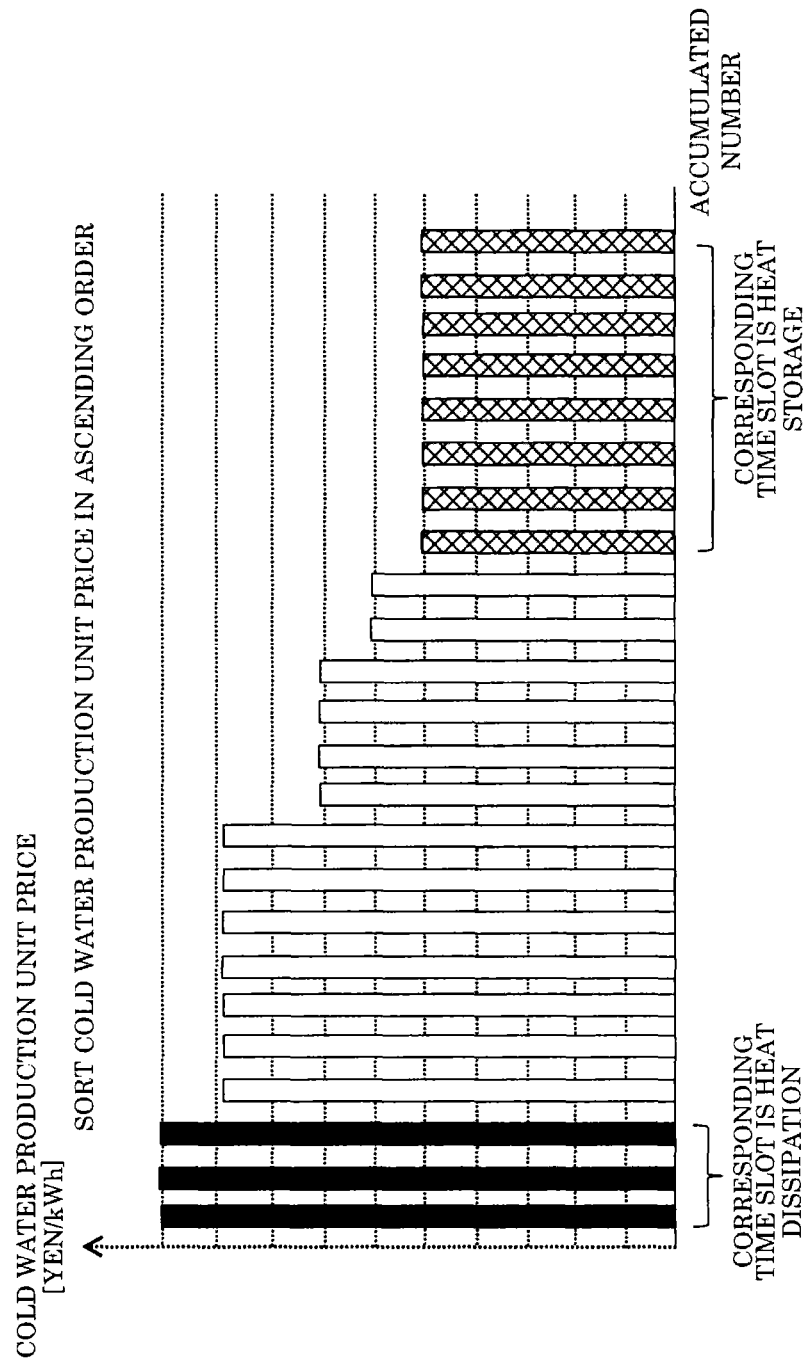
FIG. 13 is a diagram illustrating an example in which cold water production unit price in a day is arranged in an ascending order.

Next, the heat-storage/heat-dissipation allocating unit 125 allocates heat dissipation and heat storage for each clock time in accordance with the cold water production unit price (step S26). That is, the cold water production unit prices at the respective clock times in FIG. 12 are sorted in an ascending order as illustrated in FIG. 13, heat dissipation is allocated successively in an order of a time slot with a higher cold water production unit price, and heat storage is allocated successively in an order of a time slot with a lower cold water production unit price.

Figure 14:
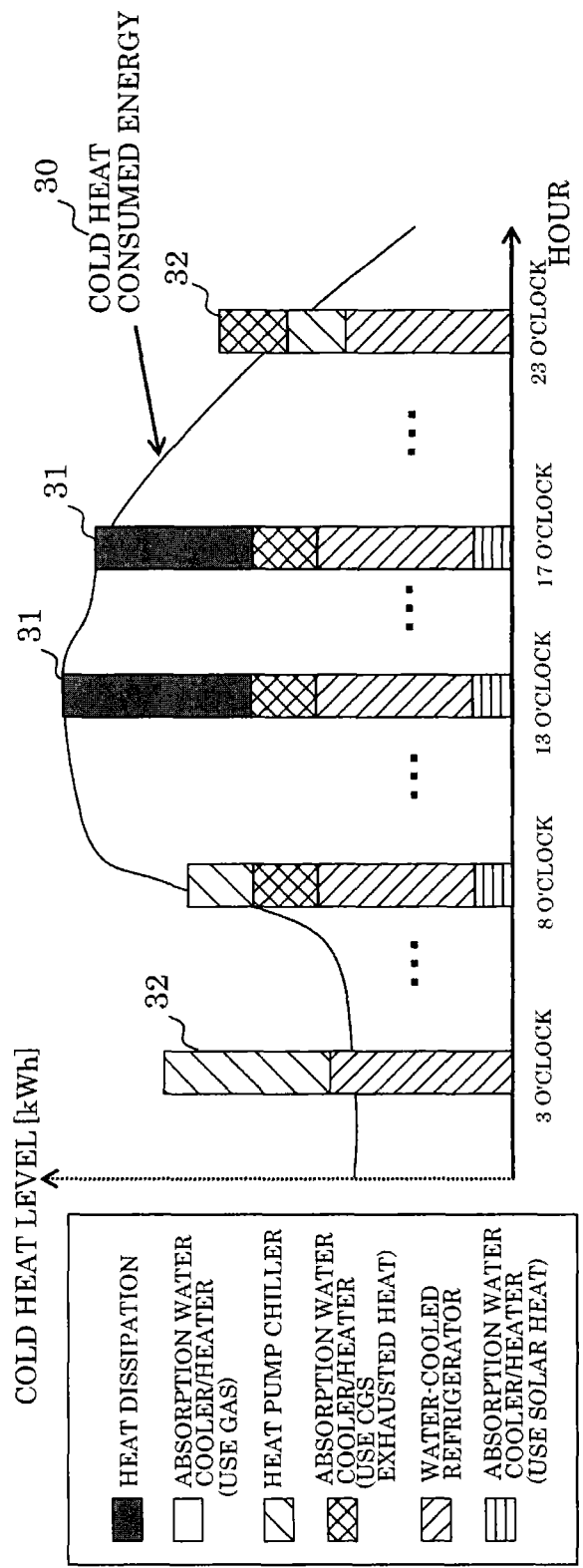
FIG. 14 is a diagram illustrating an allocation of a control-target device in accordance with a low-temperature production unit price.

FIG. 14 illustrates an example case in which the shares of the control-target devices 2 to be activated in consideration of heat dissipation of the thermal energy storage facilities and heat storage thereof are piled up. In FIG. 14, a portion 32 that exceeds the predicted cold heat consumed energy 30 indicates heat storage to the thermal energy storage facilities.
(Heat-storage-level Determining Process)

The heat-storage-level determining unit 126 determines whether or not the integrated value of the heat dissipation level of the thermal energy storage facilities or the heat storage level thereof reaches the capacity of the thermal energy storage facilities (step S27). When it does not reach the capacity of the thermal energy storage facilities (step S27: NO), the process returns to the step S25 again. That is, the production-unit-price collecting process and the heat-storage/heat-dissipation allocating process are repeated.

When the heat-storage-level determining unit 126 determines that the integrated value of the heat storage level or the heat dissipation level reaches the capacity of the thermal energy storage facilities (step S27: YES), the device start-stop optimizing process is terminated. An optimization of the start-stop of the devices in consideration of the heat dissipation of the thermal energy storage facilities and the heat storage thereof that minimize the evaluation index can be realized through the above-explained processes.
[1-5. Optimizing Process of Electric/Thermal Energy Storing Schedule]

Figure 5:
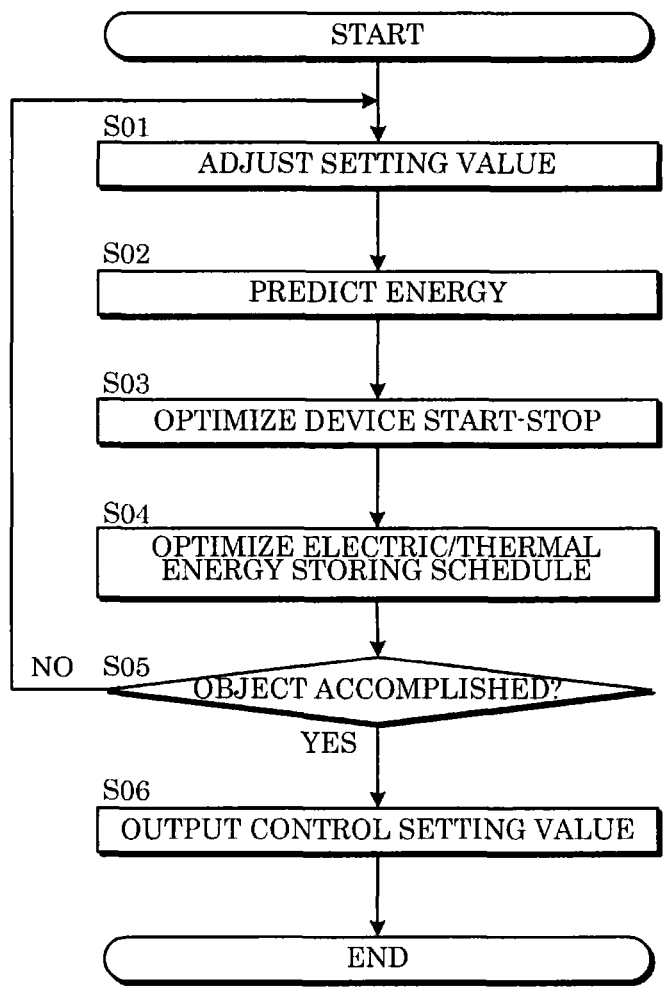
FIG. 5 is a flowchart illustrating a process procedure of planning a next-day schedule by the electric/thermal energy storage schedule optimizing device.
Figure 7:
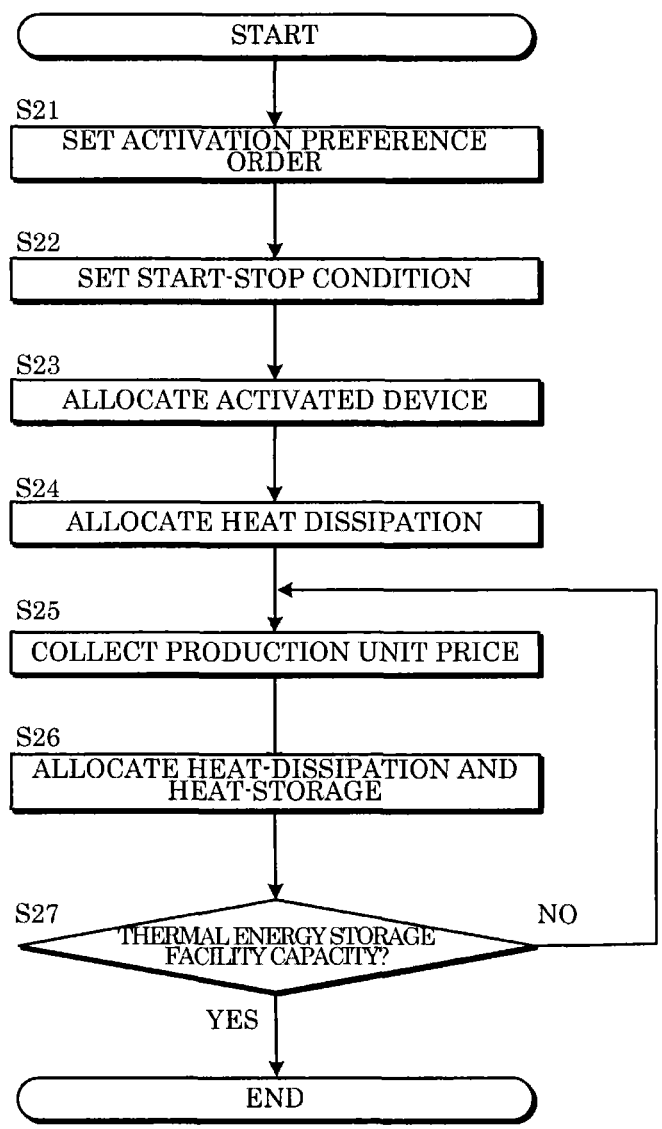
FIG. 7 is a flowchart illustrating a process procedure by a start-stop optimizing unit.

Returning to the flowchart of FIG. 5, the explanation will be further given. The status-quantity optimizing unit 13 creates an electric/thermal energy storing schedule using information on the activated device at each clock time derived by the device start-stop optimizing unit 12 (step S04).

The status-quantity optimizing unit 13 optimizes the successive status quantity like the supplied heat level of the control-target device 2 having the start-stop routine set already by the device start-stop optimizing unit 12 so as to satisfy the restraint of the whole facilities. In this example, the evaluation index to be optimized is a cost. In this case, for example, an objective function for the minimization can be defined as the following formula 21, and a constraint condition function can be defined as the following formulae 22 to 27.

OBJECTIVE FUNCTION [FORMULA 21]

$$\sum_{t=1}^{24} [X1^t \cdot E_C + GAS^t \cdot GAS_C] \Rightarrow \min$$

CONSTRAINT CONDITION FUNCTION

-continued $$X1^t + E_{CGS} \cdot X8^t \cdot X11^t + E_{PV} \cdot (X10^t - X10^{t+1}) = \quad \text{[FORMULA 22]}$$
$$\frac{H_{HP-C}}{COP_{HP-C}} \cdot X2^t \cdot X12^t +$$
$$\frac{H_R}{COP_R} \cdot X7^t \cdot X17^t + E'_{DEMAND}$$

$$GAS^t = GAS_{CGS} \cdot X8^t \cdot X11^t + \quad \text{[FORMULA 23]}$$
$$GAS_{ABR-CG} \cdot X5^t \cdot X15^t + GAS_{ABR-HG} \cdot X6^t \cdot X16^t$$

$$H_{HP-C} \cdot X2^t \cdot X12^t + H_{ABR-CH} \cdot X4^t \cdot X14^t + \quad \text{[FORMULA 24]}$$
$$H_{ABR-CG} \cdot X5^t \cdot X15^t + H_R \cdot X7^t \cdot X17^t +$$
$$(X9^t - X9^{t+1}) = HC^t_{DEMAND}$$

$$H_{CGS} \cdot X8^t \cdot X11^t + H_{HP-H} \cdot X3^t \cdot X13^t + \quad \text{[FORMULA 25]}$$
$$H^t_{SH} + H_{ABR-HG} \cdot X6^t \cdot X16^t >$$
$$H_{ABR-IN} \cdot X4^t \cdot X14^t + HH^t_{DEMAND}$$

$$(X6^t - X6^{t+1}) \le 0 \quad \text{[FORMULA 26]}$$
or
$$(X6^t - X6^{t+1}) > 0$$

$$(X7^t - X7^{t+1}) \le 0 \quad \text{[FORMULA 27]}$$
or
$$(X7^t - X7^{t+1}) > 0$$

$E_C$: POWER COEFFICIENT (UNIT PRICE IN THIS EXAMPLE)
$GAS_C$: GAS COEFFICIENT (UNIT PRICE IN THIS EXAMPLE)
$E_{CGS}$: RATED POWER GENERATION LEVEL
$E_{PV}$: PREDICTED PV POWER GENERATION LEVEL
$H_{HP-C}$: HEAT PUMP CHILLER RATED COOLING LEVEL (WHEN PRODUCING COLD WATER)
$H_{HP-H}$: HEAT PUMP CHILLER RATED HEATING LEVEL (WHEN PRODUCING HOT WATER)
$H_R$: REFRIGERATOR RATED COOLING LEVEL
$H_{ABR-CH}$: ABSORPTION CHILLER HEATER RATED COOLING LEVEL (WHEN PRODUCING COLD WATER, LOADED WITH EXHAUSTED HEAT)
$H_{ABR-CG}$: ABSORPTION CHILLER HEATER RATED COOLING LEVEL (WHEN PRODUCING COLD WATER, USING GAS)
$H_{ABR-HG}$: ABSORPTION CHILLER HEATER RATED HEATING LEVEL (WHEN PRODUCING HOT WATER, USING GAS)
$H_{ABR-IN}$: ABSORPTION CHILLER HEATER RATED HEAT INPUT LEVEL
$H_{HS}$: PREDICTED SOLAR HEAT COLLECTED LEVEL
$COP_{HP-C}$: HEAT PUMP CHILLER (WHEN PRODUCING COLD WATER)
$COP_R$: REFRIGERATOR COP
GAS: GAS USE QUANTITY
$GAS_{CGS}$: CGS RATED GAS USE QUANTITY
$GAS_{ABR-CG}$: ABSORPTION CHILLER HEATER RATED GAS USE QUANTITY (WHEN PRODUCING COLD WATER)
$GAS_{ABR-HG}$: ABSORPTION CHILLER HEATER RATED GAS USE QUANTITY (WHEN PRODUCING HOT WATER)
$E_{DEMAND}$: PREDICTED POWER CONSUMED ENERGY
$HC_{DEMAND}$: PREDICTED COLD HEAT CONSUMED ENERGY
$HH_{DEMAND}$: PREDICTED HOT HEAT CONSUMED ENERGY

Optimization is enabled by obtaining variables X1 to X17 that minimizes the formula 21 from the formulae 22 to 27. FIG. 15 illustrates example summarized variables X1 to X17 for optimization. Superscript notation t of the variables, etc., indicates a time. The power coefficient and the gas coefficient in the formula 21 vary depending on the evaluation index to be optimized. The corresponding values are, for example, a power unit price and a gas unit price in the case of a cost minimization, and are $CO_2$ exhaust coefficients in the case of a $CO_2$ minimization.

In the formulae 22 to 25, there are multiple terms that are mainly the product of the loading factor variable of the control-target device 2 and the activation termination variable thereof. Accordingly, when this problem is directly solved, it is necessary to apply a non-linear equation solver algorithm.

According to the present embodiment, however, as explained above, the start-stop condition of the control-target device 2 is optimized in advance by the device start-stop optimizing unit 12. Hence, X11 to X17 among the above-explained variables become constant values, and the problem is linearized. Therefore, it becomes unnecessary to directly solve the above-explained problem, and an optimized value can be simply derived through a general linear algorithm.

In this example, the explanation was given of the case in which a solution is obtained for the successive status quantity of the control-target device 2 through a mathematical programming technique. However, an optimized status quantity can be derived by repeated computation through simulations.

[1-6. Object Accomplishment Determining Process]

Next, the object accomplishment determining unit 14 determines whether or not the electric/thermal energy storing schedule obtained above satisfies the target value (step S05). The target value stored in the process-data storing unit 22 includes, as explained above, the power saving instruction value, the peak-shift request value, and a request value from the manager of the construct, etc.

That is, the comparing unit 14a of the object accomplishment determining unit 14 compares the demand/supply balance, the target value stored in the process-data storing unit 22, and the electric/thermal energy storing schedule at each clock time. Next, the determining unit 14b determines whether or not the electric/thermal energy storing schedule satisfies the target value based on the comparison result by the comparing unit 14a. Whether or not the target value is satisfied can be determined based on, when the target value is a restraint value, whether or not the target value is equal to or smaller than the restraint value. The target value may be a restraint per a day or may be a restraint per a time slot.

When the determining unit 14b determines that the target value is satisfied (step S05: YES), the output instructing unit 14c instructs the control-setting-value output unit 15 to output the electric/thermal energy storing schedule and the control setting value to the control-target device 2.

When the determining unit 14b determines that the target value is not satisfied (step S05: NO), the adjustment instructing unit 14d instructs the setting-value adjusting unit 10 to adjust again the setting value.

[1-7. Control-setting-value Outputting Process]

When the object accomplishment determining unit 14 determines that the target value is accomplished, the control-setting-value output unit 15 outputs the control setting value to the local control device 3 of each control-target device 2 (step S06).

Various output timings of the control setting value are possible. For example, the output timing is set to be a previous day to the execution day of the electric/thermal energy storing schedule, and each local control device 3 stores the received control setting value. Next, each local control device 3 executes a control on the execution day based on the control setting value. Moreover, the current day that is the execution day of the electric/thermal energy storing schedule may be an output timing.

Moreover, values calculated through the successive processes by the optimizing unit 40 including the electric/thermal energy storing schedule are stored in the optimized-data storing unit 23.

Conversely, when the object accomplishment determining unit 14 determines that the target value is not accomplished, the process returns to the step S01, and the successive optimizing processes beginning from the setting-value adjusting process are executed again. The electric/thermal energy storage optimizing device 4 keeps optimizing the electric/thermal energy storing schedule as explained above until the target value is accomplished.

The above explanation was the process by the electric/thermal energy storage optimizing device 4 of optimizing the next day's operation schedule at the night before the current day. The explanation was given of the case in which the above-explained successive processes have the evaluation index to be minimized being a cost. The evaluation index may be, however, other than the cost. For example, $CO_2$, a peak receiving power level, and a consumed energy can be also the evaluation index to be minimized. Moreover, a composite evaluation index that is a combination of those evaluation indexes may be used.

Figure 16:
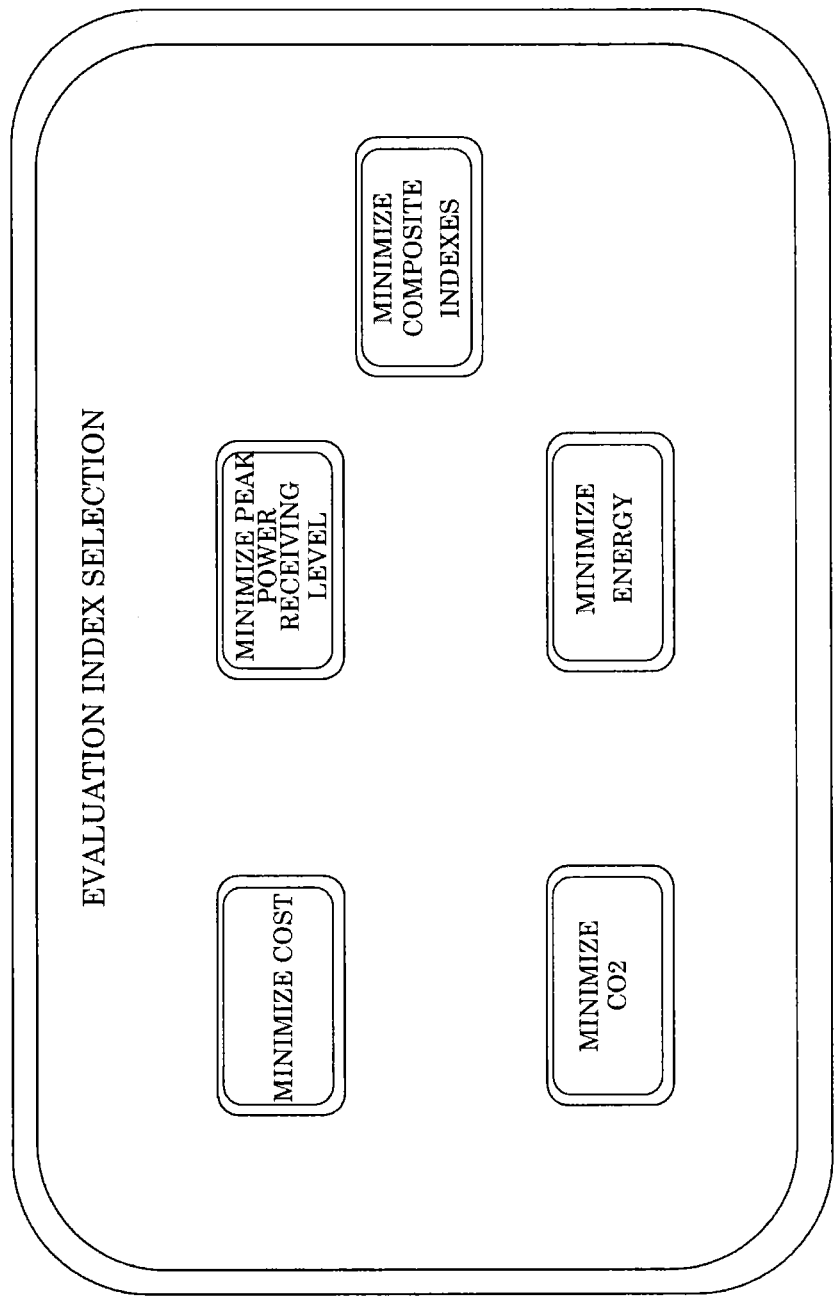
FIG. 16 is a diagram illustrating an example selection screen for an evaluation index.

FIG. 16 illustrates an example GUI for selecting an evaluation index to be minimized through the setting-parameter input unit 21. This can be realized by the input unit and the output unit realized as a touch panel. The operator selects a button corresponding to each evaluation index displayed on the screen of the display device, thereby selecting a desired evaluation index. In this case, like the above-explained method, the electric/thermal energy storing schedule that minimizes each evaluation index through the electric/thermal energy storage optimizing device 4 can be obtained.

[2. When Schedule is Changed on Current Day]

The control-target devices 2 start actual operations on next day based on the electric/thermal energy storing schedule optimized at the night before the current day as explained above.

An explanation will be given of an operation of the electric/thermal energy storage optimizing device 4 when the electric/thermal energy storing schedule is changed on the current day when the control-target devices 2 are being operated with reference to the flowchart of FIG. 17. The basic processes after the start of the re-scheduling are the same as those of the above-explained optimizing process at the night before the current day, and thus the explanation thereof will be simplified below.

The re-scheduling necessity determining unit 17 determines at a predetermined timing whether or not a re-scheduling is necessary after the start of the operation of the control-target devices 2 (step S07). The determination is made based on checking data on the control setting values, etc., stored in the optimized-data storing unit 20 with the operation data, etc., stored in the process-data storing unit 22.

The determination timing can be set as follows:
(1) preset cycle (e.g., every 30 minutes);
(2) when a request from the operator is input;
(3) when supplying energy or consumed energy of the PV 101, etc., subjected to a prediction keenly changes;
(4) when an actual climate condition (e.g., a temperature, a humidity, or a weather) does not match weather forecast utilized for a prediction or suddenly changes therefrom; and
(5) when the electric/thermal energy storing schedule optimized by the status-quantity optimizing unit 13 becomes mismatched from the actual operation status of the device.

Data to be compared and utilized for the determination can be as follows:
(a) An actual value of supplying energy and consumed energy and a predicted value; and
(b) A control setting value of the optimized electric/thermal energy storing schedule and an actual operation status of the device.

When the difference therebetween does not exceed each predetermined threshold, the re-scheduling necessity determining unit 17 determines that the re-scheduling is unnecessary (step S07: NO). When the difference therebetween exceeds the predetermined threshold, the re-scheduling necessity determining unit 17 determines that the re-scheduling is necessary (step S07: YES).

When the re-scheduling necessity determining unit 17 determines that the re-scheduling is necessary as explained above, the setting-value adjusting unit 10 executes a setting-value adjusting process (step S08). In this setting-value adjusting process, the setting-value adjusting unit 10 obtains the control setting values, such as the set temperature of the air-conditioner and the illuminance of the illuminator, from the process-data storing unit 22 like the process at the previous day before the current day.

The predicting unit 11 predicts the supplying energy and the consumed energy of the control-target devices 2 through the same scheme as that of the above-explained process executed on the previous day using the latest process data stored in the process-data storing unit 22 (step S09).

The device start-stop optimizing unit 12 optimizes the device start-stop schedule through the same scheme as that of the above-explained process executed on the previous day (step S10). Next, the status-quantity optimizing unit 13 creates an electric/thermal energy storing schedule with the current heat storage level of the thermal energy storage facilities and the current charging level of the battery stored in the process-data storing unit 22 being as initial values (step S11).

The object accomplishment determining unit 14 determines whether or not the electric/thermal energy storing schedule accomplishes the object (step S12). That is, when the determining unit 14b determines that the object is accomplished (step S12: YES), in response to an instruction from the output instructing unit 14c, the control-setting-value output unit 15 outputs the electric/thermal energy storing schedule and the control setting value to the control-target device 2 (step S15).

When the determining unit 14b determines that none of the objects is accomplished (step S12: NO), the notifying unit 18a of the inquiring unit 18 notifies the local control device 3 of the object and the optimized result (step S13). The notification target may be the terminal of the construct manager.

In the local control device 3, the operator confirms the electric/thermal energy storing schedule displayed on the display device, and inputs a response to the effect whether or not to accept it through the input device.

The receiving unit 18b of the inquiring unit 18 receives a response from the local control device 3 (step S14). The output instructing unit 18c instructs the control-setting-value output unit 15 to output the control setting value when the receiving unit 18b receives an acceptance response (step S14: YES). The control-setting-value output unit 15 outputs the control setting value to the local control device 3 (step S15).

The adjustment instructing unit 18d instructs the setting-value adjusting unit 10 to perform re-adjustment when the receiving unit 18b receives a non-acceptance response (step S14: NO). The adjusting unit 10b of the setting-value adjusting unit 10 adjusts the control setting values, such as a set temperature of the air-conditioner and the illuminance of the illuminator, based on the preset device preference order so as to increase the load level.

An explanation will now be given of the load level. The load level is a temperature setting relating to air-conditioning, the PMV setting, and an illuminance setting relating to illumination of the illuminator. When the load level is high, the air-conditioning setting or the illumination setting decreases the comfort or the workability of persons in the construct 1.

Figure 17:
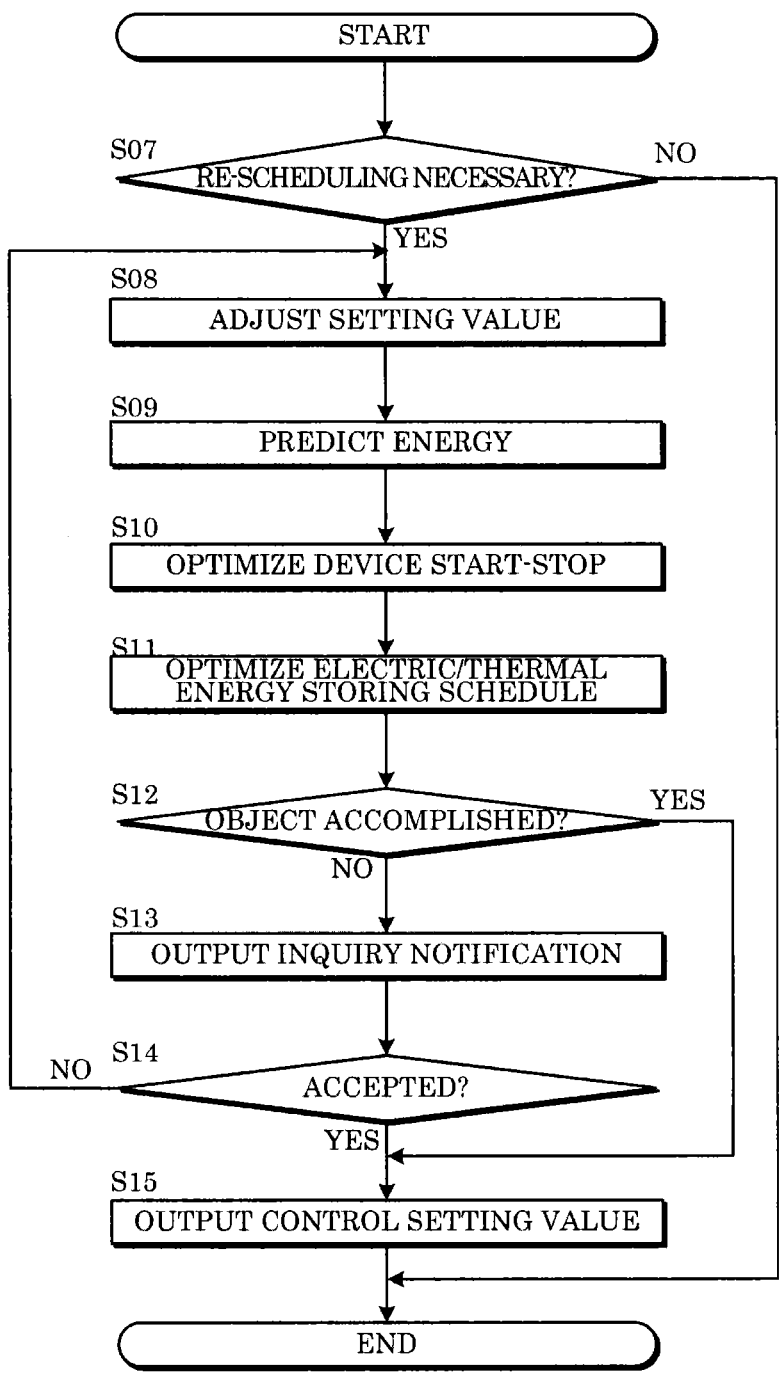
FIG. 17 is a flowchart illustrating a process procedure when a current-day rescheduling is performed.

The adjusting unit 10b of the setting-value adjusting unit 10 repeats setting change in the direction of increasing the load level until all objects to be determined by the object accomplishment determining unit 14 are satisfied in the flowchart of FIG. 17.

It is appropriate that the object accomplishment determining unit 14 does not ask the acceptance/non-acceptance to the operator for each of the above-explained repeated operations. For example, when all objects to be determined by the object accomplishment determining unit 14 are satisfied, the notifying unit 18a may notify the local control device 3 of the load level based on the adjusted setting value. This notification is displayed on the display device of the local control device 3, and presented to the operator.

Figure 18:
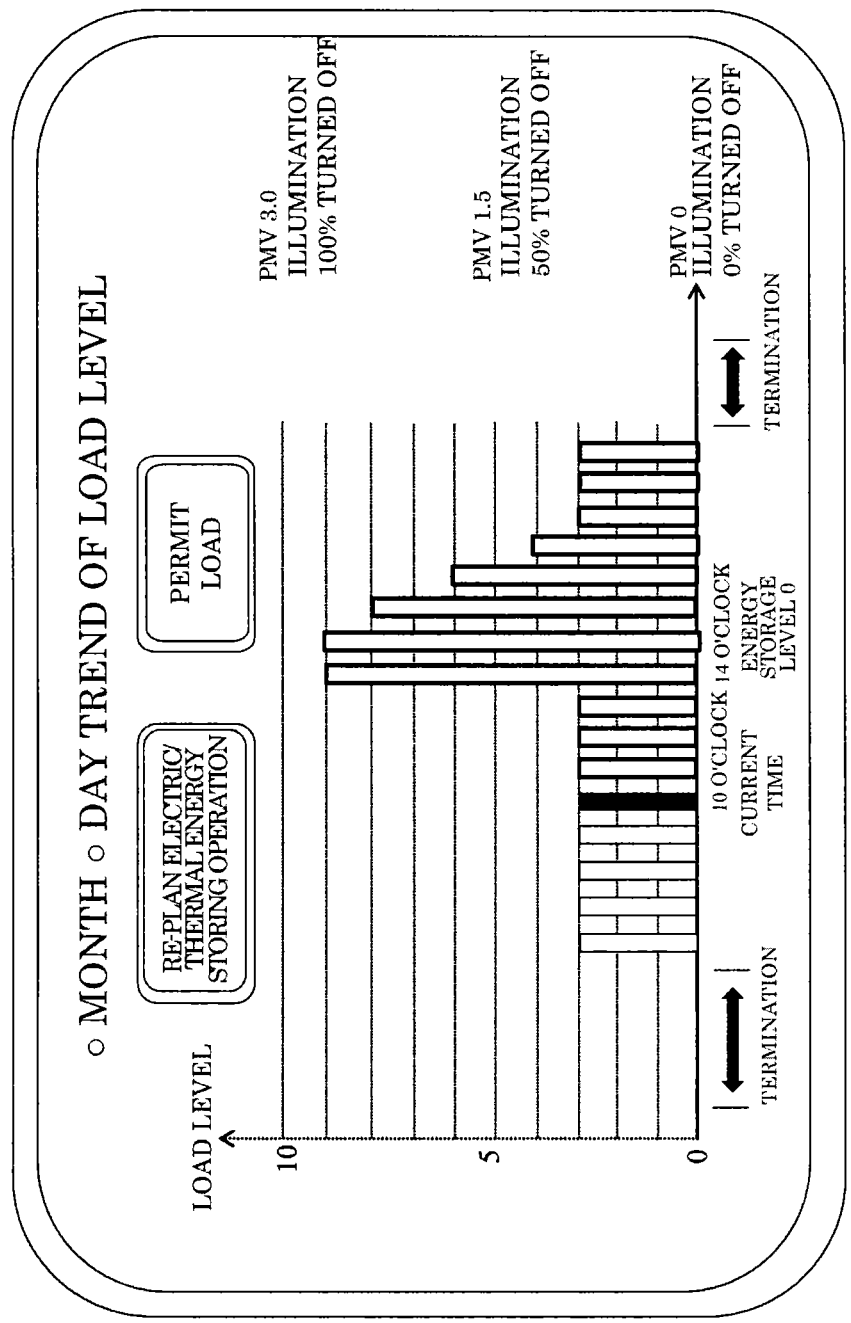
FIG. 18 is a diagram illustrating an example presentation of a load level in a set value adjusting unit.

FIG. 18 illustrates an example presentation. In this example, the load level for each clock time is presented in the form of a graph, and a button for permitting the load and an electric/thermal-energy-storing-operation re-scheduling button for not permitting the load are displayed. The operator selects any one of the buttons through the input unit of the local control device 3, thereby responding to the inquiry.

Figure 19:
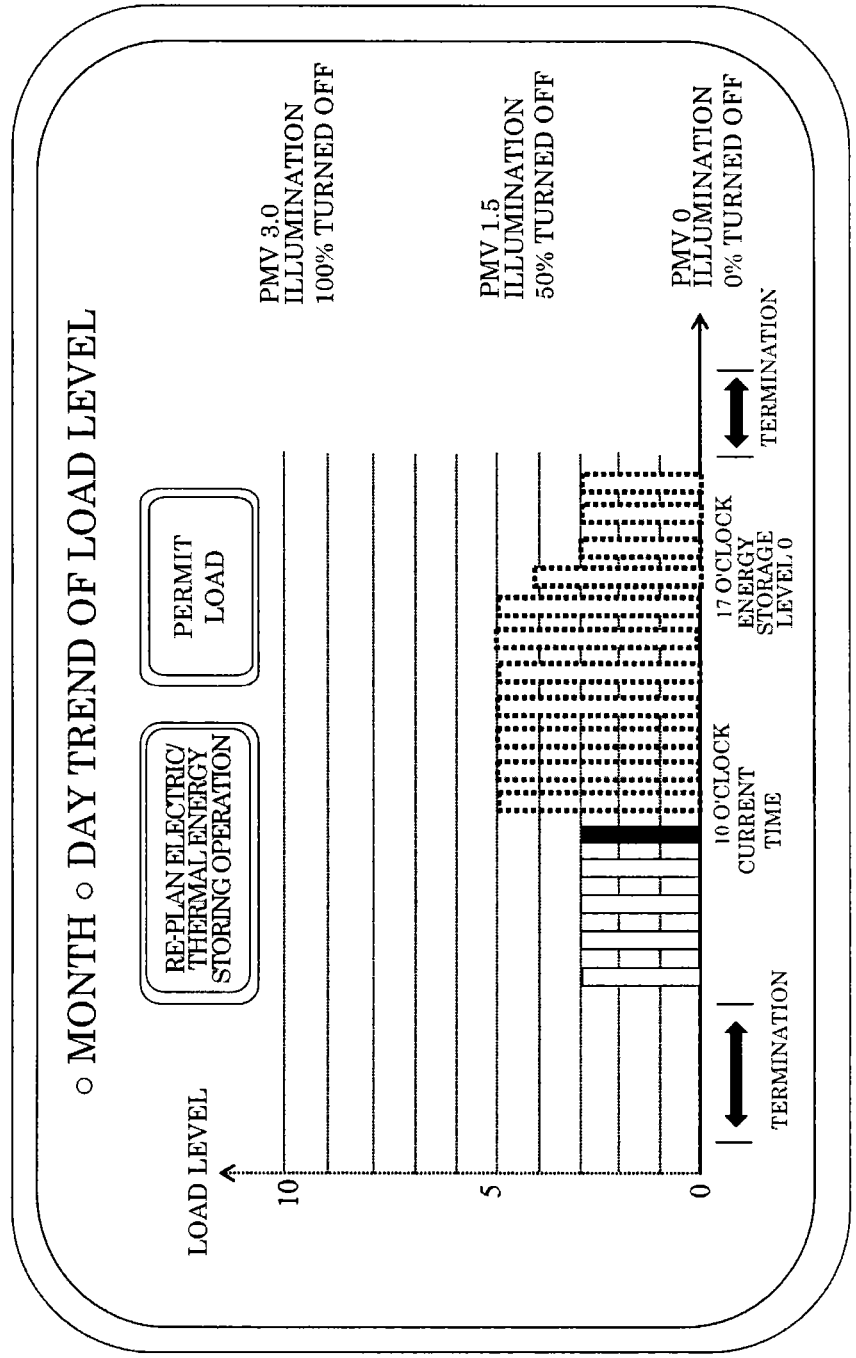
FIG. 19 is a diagram illustrating an example presentation of a load level in the set value adjusting unit.

Moreover, as illustrated in FIG. 19, the displayed load level may be changed by the operator using the input unit. The receiving unit 18b of the inquiring unit 18 receives information on a change in the load level from the local control device 3. The adjusting unit 10b of the setting-value adjusting unit 10 does not automatically change the setting value, but changes the setting value based on the load level received by the receiving unit 18b. Those processes are the same when an inquiry is notified to the terminal of the construct manager.

Furthermore, the setting-value adjusting unit 10 may adjust the PMV setting and the illumination setting for each room in accordance with the number of persons present in each room 110 in the construct 1.

For example, as illustrated in FIG. 2, it is presumed that the camera 115 is installed in each room 110. This camera 115 is connected with an analyzing device that analyzes the number of persons present in the room based on a picked-up image.

The number of persons present in the room from the analyzing device is input through the setting-parameter input unit 21, and stored in the process-data storing unit 22. The adjusting unit 10b of the setting-value adjusting unit 10 adjusts the PMV setting and the illumination setting in accordance with the number of persons present in the room for each room.

Figure 20:
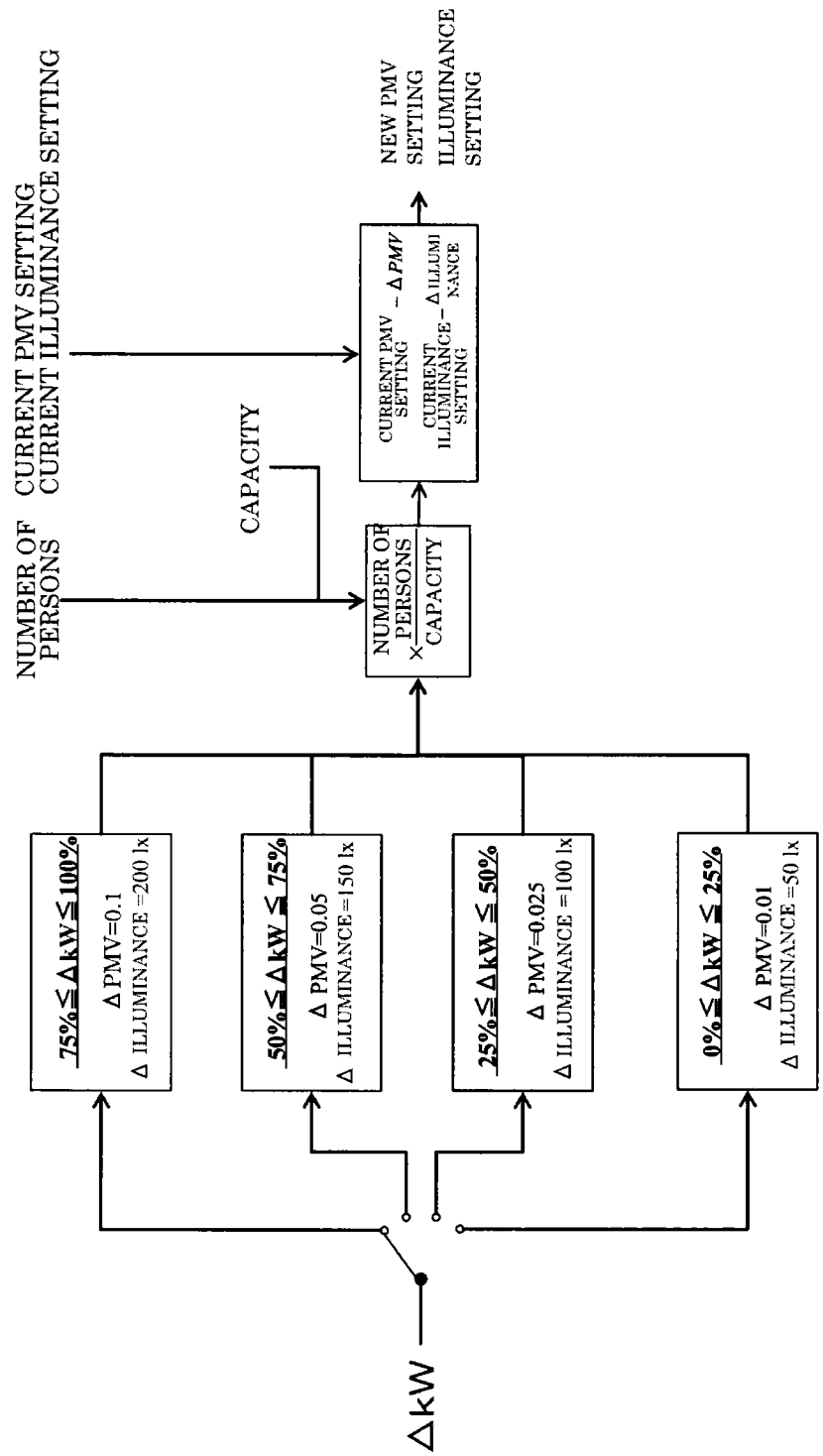
FIG. 20 is a diagram illustrating logics of a PMV setting and an illuminance setting in accordance with a number of persons present in a room.

A logic of adjusting the setting value in accordance with the number of persons present in the room as explained above will be illustrated in FIG. 20. In FIG. 20, a change range of the PMV setting and that of the illumination setting are derived based on a dissociation level $\Delta kW$ [%] from the target value. It is presumed in this example that the target value is a power receiving level limited value in accordance with a power saving instruction.

Furthermore, weighting are added to the change range of the PMV setting and the illumination setting in accordance with the number of persons in the room and the maximum capacity of the room for each room, and differences from the current values are obtained. Accordingly, new PMV setting and illumination setting are derived.

Figure 21:
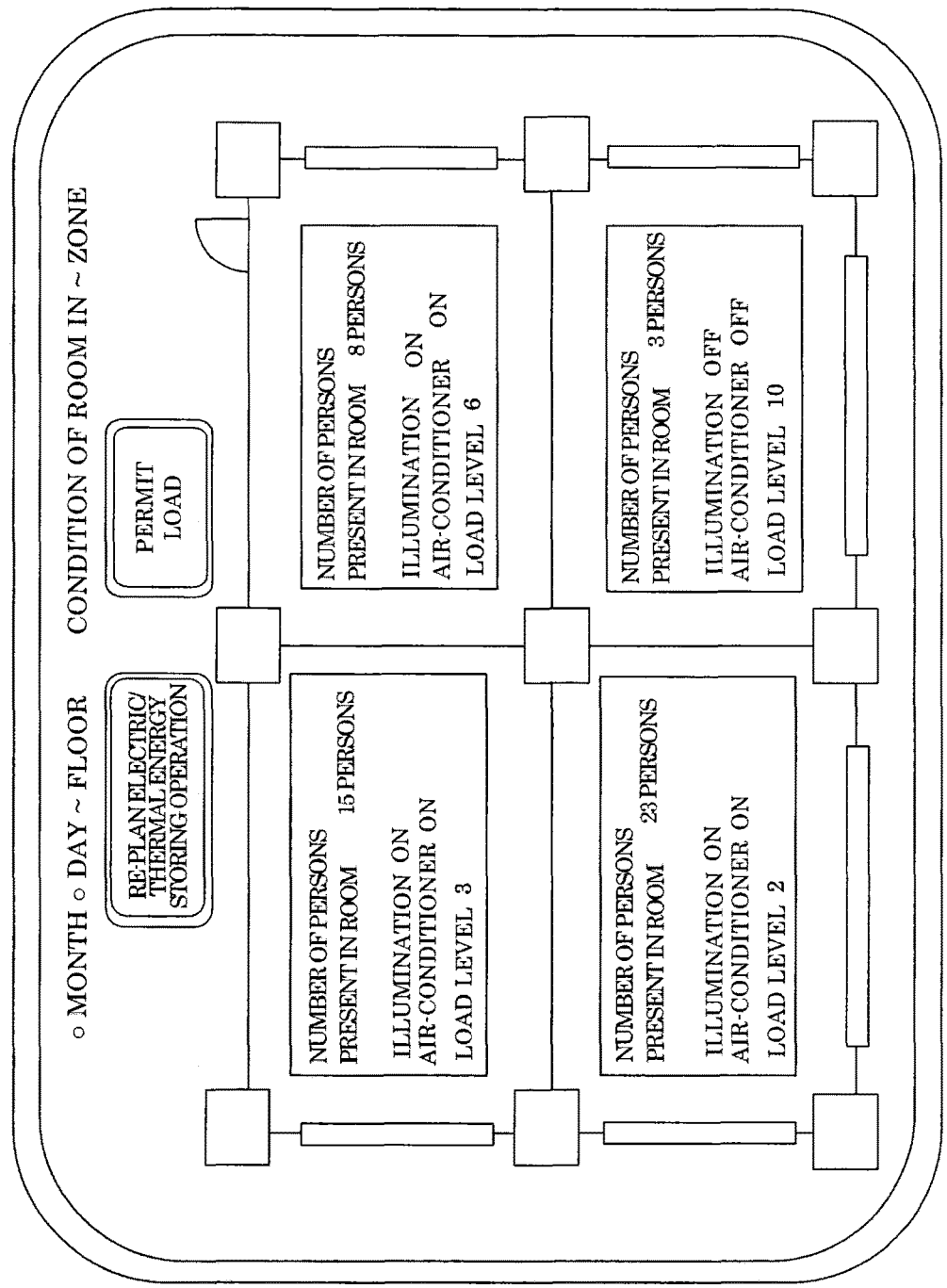
FIG. 21 is a diagram illustrating an example presentation of a room-by-room load level in accordance with a number of persons present in a room by the setting value adjusting unit.

For example, as illustrated in FIG. 21, the lower load level is set for a room where the number of persons in the room is large. Conversely, the higher load level is set for a room where the number of persons in the room is small. Moreover, all devices in the room are shut down for the room where the number of persons in the room is small. Accordingly, it becomes possible to prompt the persons in the room to move to another room.

D. Advantages of Embodiment

According to the above-explained present embodiment, the prediction precision can be improved by predicting the consumed energy or the supplying energy of the control-target devices 2 in consideration of the control setting values of the control-target devices 2. That is, it becomes possible to precisely predict the consumed energy or the supplying energy of the plurality of control-target devices 2 of different types by utilizing past control setting values of the same control-target devices 2 installed in the same room.

Moreover, when the PV 101 and the solar-powered water heater 107 are installed which change the output in accordance with a climate condition, the electric/thermal energy storing schedule can be obtained so as to maintain the demand/supply balance of the energy of the whole construct 1.

The electric/thermal energy storing schedule of the various control-target devices 2 relating to the supply of power and heat can be set in advance including the hysteresis. Accordingly, a practical and efficient operation plan which does not cause the control-target device 2 to excessively repeat starting and stopping can be established stably.

When a mismatch is caused between the predicted value of the consumed energy or supplying energy at the previous day and the actual value at the current day, or between the electric/thermal energy storing schedule of the control-target devices 2 and the actual operation status, the control setting values are revised to re-schedule the electric/thermal energy storing schedule. Accordingly, additional energy procurement is suppressed at minimum, and the efficient operation at the whole construct 1 is enabled.

Since the consistency with the target value is determined, it becomes possible to satisfy a requirement from the exterior. In particular, an inquiry is given to the consumer end, and thus it becomes possible to prevent the load level from becoming excessively large, and to set the load level with an agreement. Furthermore, the load level can be set finely in accordance with the number of persons in each room. Accordingly, the object can be accomplished without deteriorating the comfort and the workability.

E. Other Embodiments

The above-explained embodiment is not limited to the above-explained structure.

(1) The control-target devices are not limited to the above-exemplified ones. For example, the energy supplying device may be, instead of or in addition to a solar power generation device and a solar-powered water heater, facilities that change its output depending on a climate condition like wind power generation facilities. The above-explained embodiment is suitable for a BEMS (Building Energy Management System) that is a system managing the control-target devices installed in a predetermined construct like a building. The installation location of the control-target devices are, however, not limited to a single construct or plural constructs, and may include an outdoor location. That is, the embodiment is widely applicable as an EMS (Energy Management System) that controls the control-target devices installed in a predetermined region.

(2) The electric/thermal energy storage optimizing device, the local control device, and the terminal, etc., can be realized by a computer including a CPU, etc., and controlled under a predetermined program. The program in this case physically utilizes the hardware resources of the computer to realize the above-explained processes of the respective units.

Method, program, and recording medium having stored therein a program of executing the processes of the above-explained respective units are also an aspect of the embodiment. How to set the range processed by the hardware resources and the range processed by a software including the program is not limited to any particular aspect. For example, any of the above-explained units can be configured by a circuit that realizes each process.

(3) The above-explained respective processing units and storing units, etc., may be realized by a common computer or a plurality of computers connected together over a network. For example, the process-data storing unit and the optimized-data storing unit may be configured by a server connected to the optimizing unit over the network.

(4) The memory area of each data stored in the process-data storing unit and the optimized-data storing unit can be configured as a storing unit of each data. Those storing units can be typically configured by various internal or external memories and hard disks, etc. However, all memory medium available currently or in future are available as the storing unit. A register, etc., used for a computation can be regarded as a storing unit. The way of storing includes not only a scheme of retaining information for a long time, but also a scheme of temporary retaining information for a process, and eliminating or updating the information within a short time.

(5) The specific contents of information applied to the embodiment and the values thereof are optional, and are not limited to any particular contents and values. In the embodiment, it is optional to carry out a large/small determination on the threshold and a consistent/inconsistent determination, etc., in such a way that a determination target value is included as being equal to or greater than or equal to or smaller than, or is excluded as being larger than, smaller than, exceeding or not exceeding. Hence, there is substantially no difference when, for example, "equal to or greater than" is interpreted as "larger than", and "equal to or smaller than" is interpreted as "smaller than".

(6) Several embodiments have been explained, but those embodiments are merely presented as examples, and are not intended to limit the scope of the invention. Those embodiments can be changed and modified in various forms, and permit various omission, replacement and modification without departing from the scope of the invention. Those embodiments and modifications thereof are included within the scope and subject matters of the invention, and are also included in an equivalent range to the invention set forth in claims.

The invention claimed is:

1. An electric/thermal energy storage schedule optimizing device comprising:
   a predicting unit setting predicted values of a consumed energy of a plurality of control-target devices based on a comparison between a control setting value set by a setting unit and a past control setting value or setting predicted values of a supplying energy of the plurality of control-target devices based on the comparison between the control setting value set by the setting unit and the past control setting value; and
   a start-stop optimizing unit creating start-stop schedules of the plurality of control-target devices based on the predicted values set by the predicting unit,
   wherein the start-stop optimizing unit further comprises:
      a start-stop condition setting unit setting start-stop conditions of the plurality of control-target devices in accordance with cold heat and hot heat consumed energy based on an activation preference order of the plurality of the control-target devices determined based on a predetermined evaluation index;
      an activation-device allocating unit allocating the plurality of the control-target devices to be activated at each clock time based on the start-stop conditions and the predicted values;
      a production-unit-price collecting unit computing a cold heat production unit price of a control-target device with a lowest activation preference order among the plurality of the control-target devices to be activated at each clock time;
      a heat-storage/heat-dissipation allocating unit
         allocating heat storage to clock times in an order beginning with a lowest cold heat production unit price and allocating electricity storage to clock times in an order beginning with the lowest cold heat production unit price, and
         allocating heat dissipation to clock times in an order beginning with a highest cold heat production unit price and allocating electricity dissipation to clock times in an order beginning with the highest cold heat production unit price;
      an activation-boundary-condition setting unit that sets an activation boundary condition which is a condition for activating each control-target device based on a characteristic of the control-target device and the activation preference order; and
      a deactivation-boundary-condition setting unit that
         sets a deactivation boundary condition which is a condition for deactivating each control-target device based on the characteristic of the control-target device and the activation preference order, and
         sets a deactivation dead zone between the activation boundary condition and the deactivation boundary condition by making a value of the deactivation boundary condition smaller than a value of the activation boundary condition within a range which the control-target device with a highest activation preference order is not lower than a lower limit output.

2. The electric/thermal energy storage schedule optimizing device according to claim 1, further comprising:
a setting unit that sets a control setting value for setting an activation, an operation, and a deactivation during a future predetermined time period for the plurality of the control-target devices;
a status-quantity optimizing unit that creates an electric/thermal energy storing schedule obtained by optimizing a status quantity of the control-target device to be activated based on the start-stop schedule and a characteristic of the control-target device in view of the predetermined evaluation index;
an object accomplishment determining unit that determines whether or not the electric/thermal energy storing schedule accomplishes a predetermined target value;
a control-setting-value output unit that outputs the control setting value based on the electric/thermal energy storing schedule when the object accomplishment determining unit determines that the target value is accomplished; and
an adjusting unit that adjusts the control setting value set by the setting unit when the object accomplishment determining unit determines that the target value is not accomplished.

3. The electric/thermal energy storage schedule optimizing device according to claim 2, further comprising an inquiring unit that inquires to a local control device whether or not to accept the control setting value based on the electrical/thermal energy storing schedule when the object accomplishment determining unit determines that the target value is not accomplished.

4. The electric/thermal energy storage schedule optimizing device according to claim 1, further comprising:
a re-scheduling necessity determining unit that determines whether or not a difference between the predicted value by the predicting unit and a value of actual consumed energy or supplying energy, or, a difference between the control setting value and the actual status quantity of the control-target device exceeds a predetermined threshold; and
an adjusting unit that adjusts the control setting value when the re-scheduling necessity determining unit determines that the difference exceeds the predetermined threshold.

5. The electric/thermal energy storage schedule optimizing device according to claim 1, wherein the evaluation index is a minimization of either one of or both of the consumed energy and a cost.

6. The electric/thermal energy storage schedule optimizing device according to claim 5, wherein
the control-target device includes devices that produce cold water and hot water, and
the evaluation index is a cold water production unit price and a hot water production unit price or cold water production energy and hot water production energy.

7. The electric/thermal energy storage schedule optimizing device according to claim 1, wherein
the energy consuming device includes an illuminator, and
the control setting value used for a comparison by the predicting unit is an illuminance.

8. The electric/thermal energy storage schedule optimizing device according to claim 1, wherein
the energy consuming device includes an air-conditioner, and
the control setting value used for a comparison by the predicting unit is a PMV value.

9. An electric/thermal energy storage schedule optimizing method that causes a computer to execute:
a predicting process setting predicted values of a consumed energy of a plurality of control-target devices based on a comparison between a control setting value set by a setting unit and a past control setting value or a setting predicted values of a supplying energy of the plurality of control-target devices based on the comparison between the control setting value set by the setting unit and the past control setting value; and
a start-stop optimizing process creating start-stop schedules of the plurality of control-target devices based on the predicted values set by the predicting process,
wherein the start-stop optimizing process comprises:
a start-stop condition setting process setting start-stop conditions of the plurality of control-target devices in accordance with cold heat and hot heat consumed energy based on an activation preference order of the plurality of the control-target devices determined based on a predetermined evaluation index;
an activation-device allocating process allocating the plurality of the control-target devices to be activated at each clock time based on the start-stop conditions and the predicted values;
a production-unit-price collecting process computing a cold heat production unit price of a control-target device with a lowest activation preference order among the plurality of the control-target devices to be activated at each clock time;
a heat-storage/heat-dissipation allocating process
allocating heat storage to clock times in an order beginning with a lowest cold heat production unit price and allocating electricity storage to clock times in an order beginning with the lowest cold heat production unit price, and
allocating heat dissipation to clock times in an order beginning with a highest cold heat production unit price and allocating electricity dissipation to clock times in an order beginning with the highest cold heat production unit price;
an activation-boundary-condition setting process setting an activation boundary condition which is a condition for activating each control-target device based on a characteristic of the control-target device and the activation preference order; and
a deactivation-boundary-condition setting process
setting a deactivation boundary condition which is a condition for deactivating each control-target device based on the characteristic of the control-target device and the activation preference order, and
setting a deactivation dead zone between the activation boundary condition and the deactivation boundary condition by making a value of the deactivation boundary condition smaller than a value of the activation boundary condition within a range which the control-target device with a highest activation preference order is not lower than a lower limit output.

10. A non-transitory computer-readable recording medium having stored therein an electric/thermal energy storage schedule optimizing program that causes a computer to execute:
a predicting process setting predicted values of a consumed energy of a plurality of control-target devices based on a comparison between a control setting value set by a setting unit and a past control setting value or a setting predicted values of a supplying energy of the plurality of control-target devices based on the comparison between the control setting value set by the setting unit and the past control setting value; and a start-stop optimizing process creating start-stop schedules of the plurality of control-target devices based on the predicted values set by the predicting process, wherein the start-stop optimizing process comprises:

a start-stop condition setting process setting start-stop conditions of the plurality of control-target devices in accordance with cold heat and hot heat consumed energy based on an activation preference order of the plurality of the control-target devices determined based on a predetermined evaluation index;

an activation-device allocating process allocating the plurality of the control-target devices to be activated at each clock time based on the start-stop conditions and the predicted values;

a production-unit-price collecting process computing a cold heat production unit price of a control-target device with a lowest activation preference order among the plurality of the control-target devices to be activated at each clock time; and a heat-storage/heat-dissipation allocating process
allocating heat storage to clock times in an order beginning with a lowest cold heat production unit price and allocating electricity storage to clock times in an order beginning with the lowest cold heat production unit price, allocating heat dissipation to clock times in an order beginning with a highest cold heat production unit price and allocating electricity dissipation to clock times in an order beginning with the highest cold heat production unit price;

an activation-boundary-condition setting process setting an activation boundary condition which is a condition for activating each control-target device based on a characteristic of the control-target device and the activation preference order; and a deactivation-boundary-condition setting process
setting a deactivation boundary condition which is a condition for deactivating each control-target device based on the characteristic of the control-target device and the activation preference order, and setting a deactivation dead zone between the activation boundary condition and the deactivation boundary condition by making a value of the deactivation boundary condition smaller than a value of the activation boundary condition within a range which the control-target device with a highest activation preference order is not lower than a lower limit output.

* * * * *